(12) United States Patent
Niiyama

(10) Patent No.: US 11,318,758 B2
(45) Date of Patent: May 3, 2022

(54) PRINTING APPARATUS, CONTROL METHOD OF PRINTING APPARATUS, AND NON-TRANSITORY COMPUTER-READABLE STORAGE MEDIUM STORING PROGRAM

(71) Applicant: SEIKO EPSON CORPORATION, Tokyo (JP)

(72) Inventor: Shinichiro Niiyama, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 34 days.

(21) Appl. No.: 17/017,096

(22) Filed: Sep. 10, 2020

(65) Prior Publication Data

US 2021/0078340 A1    Mar. 18, 2021

(30) Foreign Application Priority Data

Sep. 13, 2019  (JP) .............................. JP2019-167519

(51) Int. Cl.
| | |
|---|---|
| *B41J 3/407* | (2006.01) |
| *B41J 25/304* | (2006.01) |
| *B41J 25/308* | (2006.01) |
| *B41J 3/54* | (2006.01) |
| *G06F 3/12* | (2006.01) |

(52) U.S. Cl.
CPC ............. *B41J 3/4078* (2013.01); *B41J 3/54* (2013.01); *B41J 25/304* (2013.01); *B41J 25/308* (2013.01); *G06F 3/1205* (2013.01); *G06F 3/1243* (2013.01)

(58) Field of Classification Search
CPC ...... B41J 25/308; B41J 25/304; B41J 3/4078; B41J 29/393
See application file for complete search history.

(56) References Cited

U.S. PATENT DOCUMENTS

| | | | | |
|---|---|---|---|---|
| 5,541,626 | A | * 7/1996 | Hiramatsu | ............. B41J 3/4078 347/8 |
| 5,847,729 | A | 12/1998 | Takahashi et al. | |
| 2016/0107439 | A1 | 4/2016 | Mogami | |

FOREIGN PATENT DOCUMENTS

| | | | | |
|---|---|---|---|---|
| CN | 105522823 | | 4/2016 | |
| EP | 0566540 | | 10/1993 | |
| EP | 3170666 | A1 * | 5/2017 | ............ B41J 25/308 |
| JP | H07-009678 | | 1/1995 | |

(Continued)

OTHER PUBLICATIONS

Matsuo, MachineTranslation of JP-2020030118-A, 2020 (Year: 2020).*

*Primary Examiner* — Scott A Richmond
(74) *Attorney, Agent, or Firm* — Workman Nydegger

(57) ABSTRACT

A printer includes: a transport belt that transports a print medium; a print head that discharges ink to form an image on the print medium placed on the transport belt; a carriage that mounts the print head thereon and scans in an intersecting direction that intersects a transport direction of the print medium; a sensor unit that detects a non-printable area of the print medium capable of coming into contact with the print medium placed on the transport belt and the print head; and a control section that retracts the carriage from a position where the image is formed by the print head when the sensor unit detected the non-printable area during the printing, causes the transport belt to transport the print medium until the non-printable area is positioned downstream of the print head in the transport direction, and continues printing from a printable area adjacent to the non-printable area.

8 Claims, 14 Drawing Sheets

(56) References Cited

FOREIGN PATENT DOCUMENTS

JP        2020030118  A  *  2/2020
WO    WO-2008036620 A2  *  3/2008   ............ B41J 3/4078

* cited by examiner

PRINTING APPARATUS, CONTROL METHOD OF PRINTING APPARATUS, AND NON-TRANSITORY COMPUTER-READABLE STORAGE MEDIUM STORING PROGRAM

The present application is based on, and claims priority from JP Application Serial Number 2019-167519, filed Sep. 13, 2019, the disclosure of which is hereby incorporated by reference here in its entirety.

BACKGROUND

1. Technical Field

The present disclosure relates to a printing apparatus, a control method of a printing apparatus, and a non-transitory computer-readable storage medium storing a program.

2. Related Art

In the related art, there is known a printing apparatus capable of stopping a printing operation according to an instruction of a user. For example, JP-A-07-009678 discloses a printing apparatus that stops a printing operation when a user presses a stop key on an operation panel.

In the printing apparatus as disclosed in JP-A-07-009678, there is a case where the user stops the printing operation in order to prevent the print head from printing on an area of a print medium where the print head and the print medium can come into contact with each other. However, in this case, the contact between the print head and the print medium can be avoided, but the printing operation is stopped, which deteriorates the productivity of the printing apparatus.

SUMMARY

According to an aspect of the present disclosure, there is provided a printing apparatus including: a transport belt that transports a print medium; a print head that discharges ink to form an image on the print medium placed on the transport belt; a carriage that mounts the print head thereon and scans in an intersecting direction that intersects a transport direction of the print medium; a sensor that detects a non-printable area of the print medium where the print medium placed on the transport belt and the print head are capable of coming into contact with each other; and a control section that retracts the carriage from a position where the image is formed by the print head when the sensor detected the non-printable area during printing, causes the transport belt to transport the print medium until the non-printable area is positioned downstream of the print head in the transport direction, and continues printing from a printable area adjacent to the non-printable area.

In the printing apparatus according to the present disclosure, when the sensor detects the non-printable area during the printing, the control section may change a height of the carriage with respect to the print medium such that a workpiece gap, which is a distance between the print medium and a nozzle surface of the print head, is greater than the workpiece gap during the printing, and retract the carriage.

In the printing apparatus according to the present disclosure, the control section may cause the carriage to scan up to beyond a printing area, which is an outer side of the printing area for forming an image by discharging the ink onto the print medium, and retract the carriage.

In the printing apparatus according to the present disclosure, the sensor may detect a height of the non-printable area, and when the height of the non-printable area detected by the sensor is equal to or greater than a predetermined value, the control section may cause the carriage to scan up to beyond the printing area.

In the printing apparatus according to the present disclosure, the control section may execute a flushing operation by the print head on the non-printable area.

In the printing apparatus according to the present disclosure, the sensor may be provided downstream of a placement start position at which the transport belt starts placement of the print medium and upstream of the print head in the transport direction.

In the printing apparatus according to the present disclosure, the sensor may be a camera, and the control section may display a captured image of the non-printable area obtained by the camera on a display section.

In the printing apparatus according to the present disclosure, the print medium may be a fabric, and the non-printable area may include a seam of the fabric.

According to another aspect of the present disclosure, there is provided a control method of a printing apparatus including a transport belt that transports a print medium, a print head that discharges ink to form an image on the print medium placed on the transport belt, a carriage that mounts the print head thereon and scans in an intersecting direction that intersects a transport direction of the print medium, and a sensor that detects a non-printable area of the print medium where the print medium placed on the transport belt and the print head are capable of coming into contact with each other, the method including: retracting the carriage from a position where the image is formed by the print head when the sensor detected the non-printable area during the printing, causing the print belt to transport the print medium until the non-printable area is positioned downstream of the print head in the transport direction, and continuing printing from a printable area adjacent to the non-printable area.

According to still another aspect of the present disclosure, there is provided a non-transitory computer-readable storage medium storing a program that is executed by a control section of a printing apparatus including a transport belt that transports a print medium, a print head that discharges ink to form an image on the print medium placed on the transport belt, a carriage that mounts the print head thereon and scans in an intersecting direction that intersects a transport direction of the print medium, and a sensor that detects a non-printable area of the print medium where the print medium placed on the transport belt and the print head are capable of coming into contact with each other, the program causing the control section to retract the carriage from a position where the image is formed by the print head when the sensor detected the non-printable area during printing, cause the transport belt to transport the print medium until the non-printable area is positioned downstream of the print head in the transport direction, and continue the printing from a printable area adjacent to the non-printable area.

DESCRIPTION OF EXEMPLARY EMBODIMENTS

First Embodiment

First, a first embodiment will be described.

Figure 1:
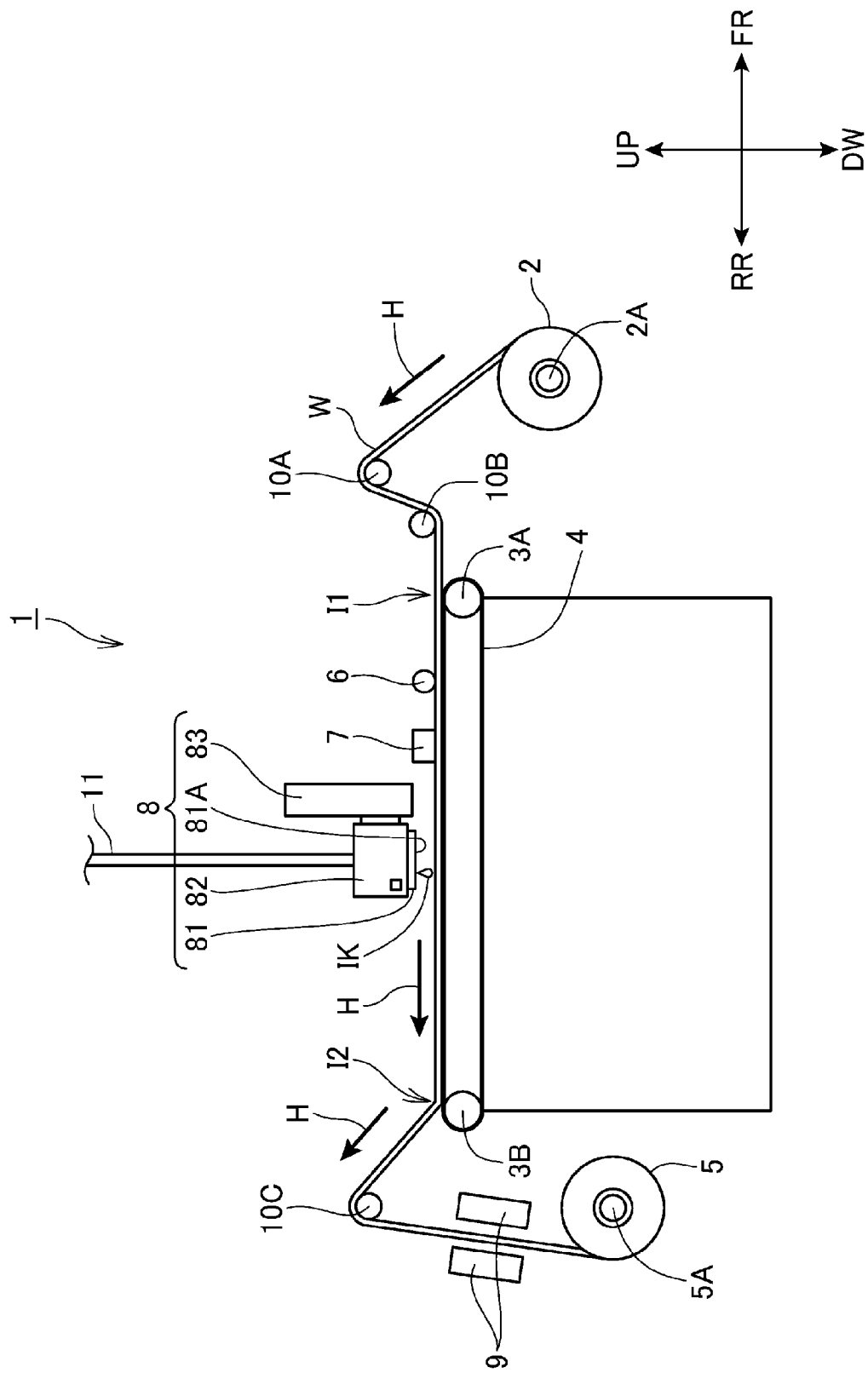
FIG. 1 is a schematic configuration view of a printer.

FIG. 1 is a schematic configuration view of a printer 1. The printer 1 corresponds to an example of a printing apparatus.

In FIGS. 1, 2, 3, and 7, the front side of the installed state of the printer 1 is indicated by reference symbol FR, and the rear side of the printer 1 is indicated by reference symbol RR. In addition, in FIGS. 1, 2, 3, and 7, the right side of the printer 1 is indicated by reference symbol R, and the left side of the printer 1 is indicated by reference symbol L. Further, in FIGS. 1, 2, 3, and 7, the upper side of the printer 1 is indicated by reference symbol UP, and the lower side of the printer 1 is indicated by reference symbol DW.

The printer 1 is an ink jet type printing apparatus that includes a print head 81 for discharging an ink IK and discharges the ink IK onto a print medium W to form an image.

The print medium W is configured, for example, such that a plurality of pieces of fabric made of natural fibers or synthetic fibers are joined to each other. The printer 1 is a textile printing machine that performs textile printing onto the print medium W by causing the ink IK to adhere to the print medium W which is a fabric. Therefore, the print medium W is a textile printing material. In the present embodiment, a fabric is used as an example of the print medium W, but, as the print medium W, plain paper, high-quality paper, paper dedicated for ink jet recording such as glossy paper, or the like can also be used in addition to a fabric.

The printer 1 includes a delivery device 2, driven rollers 10A, 10B, and 10C, transport rollers 3A and 3B, a transport belt 4, and a winding device 5. Each of the sections configures a transport mechanism 1011 that transports the print medium W which will be described later.

The delivery device 2 is a device that delivers the long print medium W wound in a roll shape to the transport belt 4. The delivery device 2 is positioned on the most upstream side in a transport direction H of the print medium W. The delivery device 2 rotates a rotation shaft 2A counterclockwise in FIG. 1 to deliver the print medium W set on the rotation shaft 2A onto the transport belt 4 via the driven rollers 10A and 10B.

The transport rollers 3A and 3B are a pair of rollers that drive the endless transport belt 4. For example, the transport roller 3A is a driving roller, and the transport roller 3B is a driven roller. The transport belt 4 is a glue belt with an adhesive layer having adhesiveness formed on the surface thereof. The print medium W delivered from the delivery device 2 is adhesively fixed to the adhesive layer of the transport belt 4 and is transported in the transport direction H together with the transport belt 4. In addition, although the glue belt with an adhesive layer formed on the surface is exemplified as the transport belt 4 of the embodiment, the transport belt 4 is not limited to the adhesive belt and may be, for example, an electrostatic adsorption type belt.

The winding device 5 is a device that winds the print medium W transported by the transport belt 4 via the driven roller 10C. The winding device 5 is positioned on the most downstream side in the transport direction H of the print medium W. The winding device 5 rotates the rotation shaft 5A counterclockwise in FIG. 1 to wind the print medium W printed by the print head 81 in a roll shape around a winding reel set on the rotation shaft 5A.

The printer 1 includes a pressing roller 6. The pressing roller 6 is provided downstream of a placement start position I1 where the transport belt 4 starts the placement of the print medium W and upstream of a sensor unit 7 which will be described later, in the transport direction H. The print medium W placed on the transport belt 4 is pressed against the transport belt 4 by the pressing roller 6. Accordingly, the printer 1 can cause the print medium W to reliably adhere to the adhesive layer formed on the surface of the transport belt 4, and can suppress a case where the print medium W placed on the transport belt 4 rises up from the transport belt 4. The pressing roller 6 is configured to be capable of reciprocating along the transport direction H in order to suppress a case where the print medium W has a roller trace.

The printer 1 includes the sensor unit 7. The sensor unit 7 corresponds to an example of a sensor. The sensor unit 7 is provided downstream of the pressing roller 6 and upstream of a printing unit 8, in the transport direction H.

Figure 2:
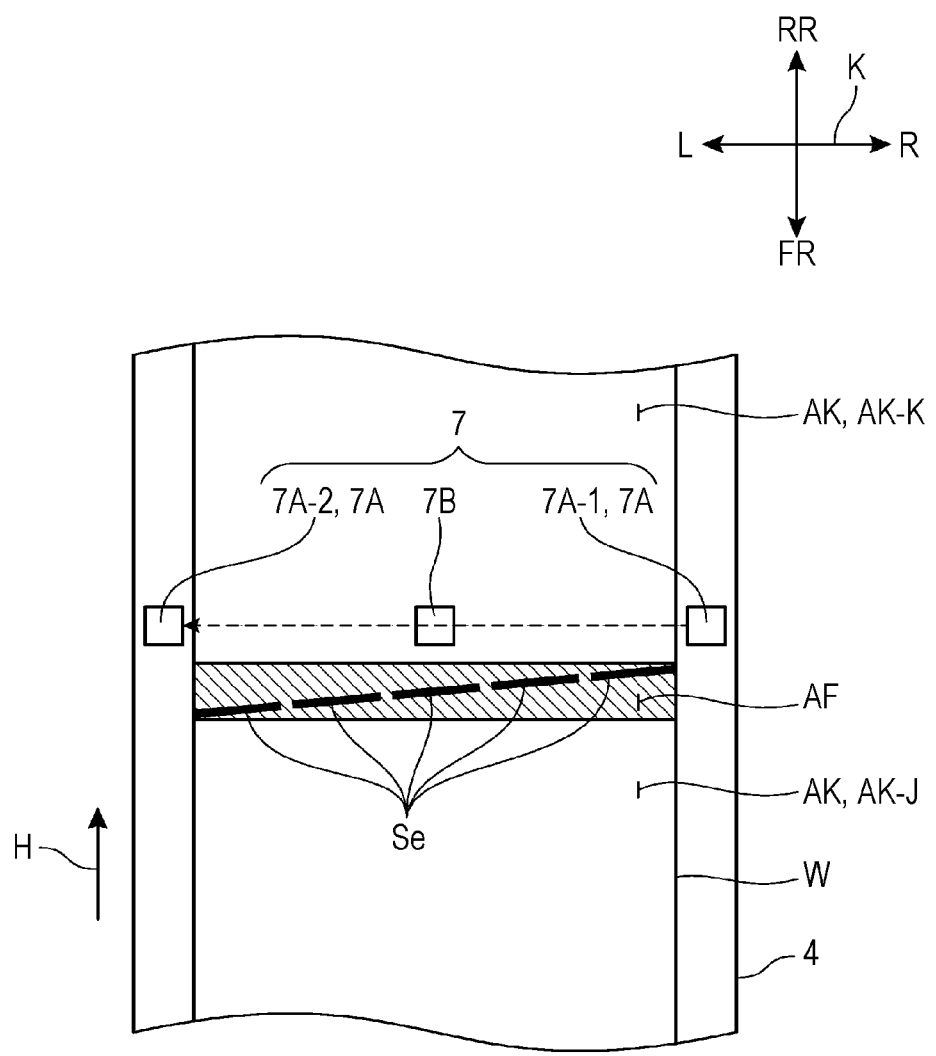
FIG. 2 is a view for describing a sensor unit.

FIG. 2 is a view for describing the sensor unit 7.

As illustrated in FIG. 2, the sensor unit 7 includes a first detection sensor 7A and a second detection sensor 7B.

The first detection sensor 7A is a sensor that detects an area of the print medium W where the print medium W placed on the transport belt 4 and the print head 81 which will be described later can come into contact with each other. In the following description, the area will be referred to as "non-printable area" and given reference symbol "AF". The first detection sensor 7A is an optical sensor and includes a light emitting section 7A-1 and a light receiving section 7A-2. The light emitting section 7A-1 and the light receiving section 7A-2 are provided so as to pinch the print medium W placed on the transport belt 4 in the left-right direction. The light emitting section 7A-1 is provided such that the optical axis of the emitted light is in the left-right direction, and the light receiving section 7A-2 is provided so as to be able to receive the light emitted by the light emitting section 7A-1. Further, the light emitting section 7A-1 and the light receiving section 7A-2 are set to have a height to be positioned between the nozzle surface 81A of the print head 81 and the print medium W adhered to the transport belt 4 in the up-down direction. The first detection sensor 7A detects the presence or absence of an object that blocks the light emitted by the light emitting section 7A-1 based on the amount of light received by the light receiving section 7A-2.

The non-printable area AF of the embodiment is an area including a seam Se of the fabric. In the print medium W, the seam Se is a place where the end portions of different fabrics are joined to each other, and is thicker than the area other than the seam Se. Therefore, in the print medium W placed on the transport belt 4, the seam Se projects above the area other than the seam Se. Accordingly, the first detection sensor 7A can detect the non-printable area AF including the seam Se by blocking the light emitted from the light emitting section 7A-1 by the seam Se. The first detection sensor 7A outputs a detection value indicating that the seam Se is being detected to the control section 100, which will be described later, while the seam Se is being detected.

The second detection sensor 7B is a sensor that detects the height of the non-printable area AF with reference to the area other than the non-printable area AF in the print medium W placed on the transport belt 4. In the following description, an area other than the non-printable area AF on the print medium W will be referred to as "printable area" and given reference symbol "AK". Further, in the following description, the printable area AK that is adjacent to the non-printable area AF, that is, the printable area AK which is upstream of the non-printable area AF in the transport direction H, will be referred to as "upstream printable area" and given reference symbol "AK-J". Further, in the following description, the printable area AK that is adjacent to the non-printable area AF, that is, the printable area AK which is downstream of the non-printable area AF in the transport direction H, will be referred to as "downstream printable area" and given reference symbol "AK-K". In addition, the upstream printable area AK-J corresponds to the downstream printable area AK-K with reference to the non-printable area AF positioned upstream of the upstream printable area AK-J in the transport direction H.

The second detection sensor 7B is an optical sensor and has a pair of a light emitting element and a light receiving element. The second detection sensor 7B is provided above the transport belt 4 and emits light toward the print medium W placed on the transport belt 4. The second detection sensor 7B detects the height of the non-printable area AF based on the light reflected from the print medium W. In addition, detection of the height of the non-printable area AF means detection of the height of the seam Se.

Returning to the description of FIG. 1, the printer 1 includes the printing unit 8. The printing unit 8 is provided downstream of the sensor unit 7 and upstream of a placement end position 12 where the transport belt 4 ends the placement of the print medium W, in the transport direction H.

The printing unit 8 includes the carriage 82.

The print head 81 is mounted on the carriage 82. The print head 81 reciprocates on the print medium W in the intersecting direction K that intersects the transport direction H together with the carriage 82. In the embodiment, the intersecting direction K is a direction orthogonal to the transport direction H and is a left-right direction of the printer 1.

Here, a basic printing operation of the carriage 82, the print head 81, and the printer 1 will be described with reference to FIG. 3.

Figure 3:
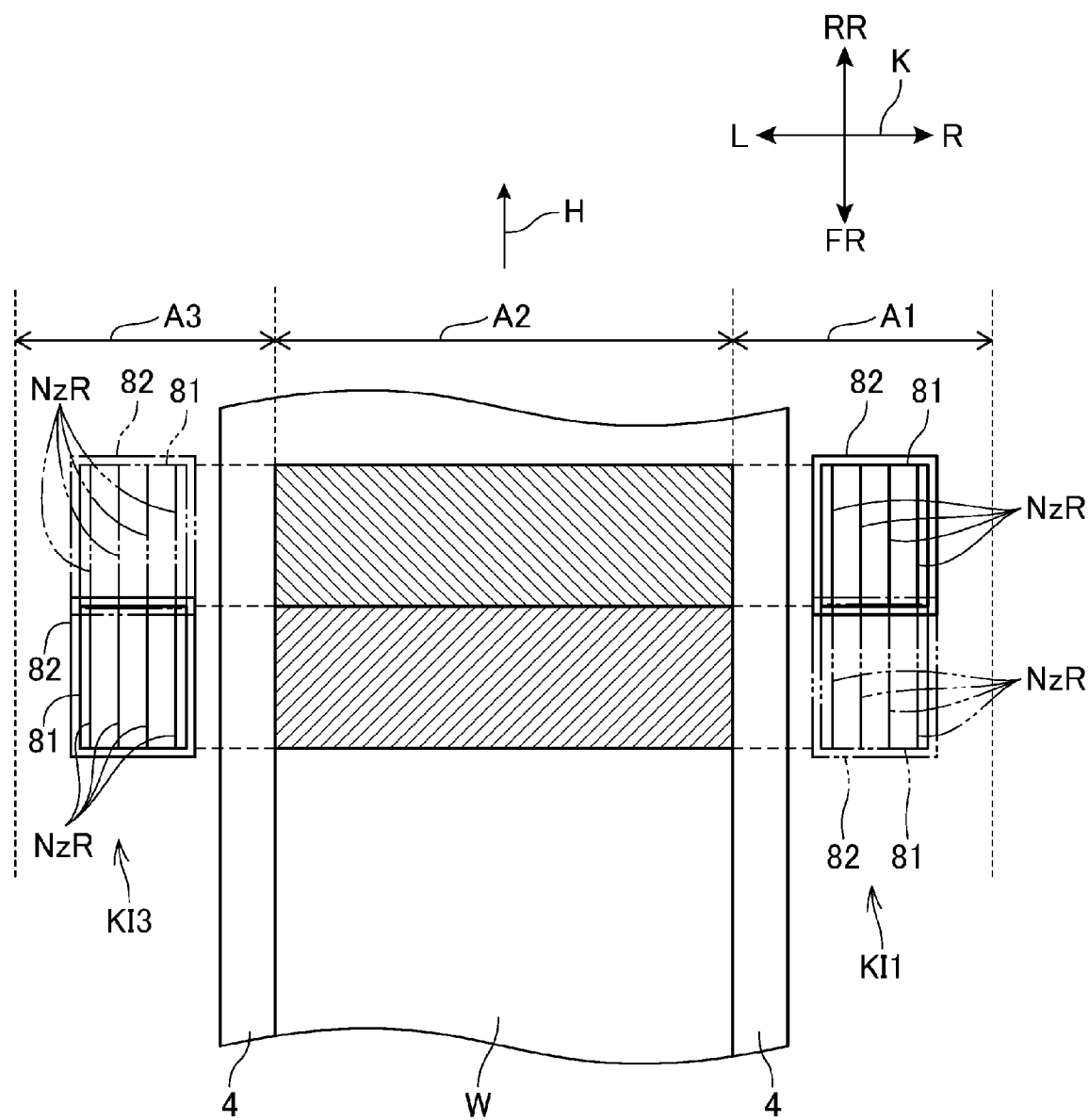
FIG. 3 is a view for describing a printing operation of a carriage, a print head, and a printer.

FIG. 3 is a view for describing the basic printing operation of the carriage 82, the print head 81, and the printer 1.

The carriage 82 reciprocates along a guide shaft (not illustrated). The guide shaft is a shaft that extends in the intersecting direction K and is provided at a position that opposes the transport belt 4. The carriage 82 reciprocates in the intersecting direction K along the guide shaft together with a gap adjusting mechanism 83 including a cam and the like.

As described above, the print head 81 is mounted on the carriage 82. In addition, various devices other than the print head 81 may be mounted on the carriage 82.

The print head 81 receives ink supply from an ink storage mechanism (not illustrated) via an ink supply path 11 and discharges the ink IK onto the print medium W placed on the transport belt 4. The ink storage mechanism is a mechanism that stores the ink IK, and includes, for example, an ink cartridge and an ink tank. The print head 81 has a plurality of nozzle rows NzR, in which a plurality of nozzles for discharging the ink IK are arranged in the transport direction H, arranged in the intersecting direction K on the surface that opposes the print medium W. For example, in order to discharge cyan (C), magenta (M), yellow (Y), and black (K) inks, the print head 81 has four nozzle rows NzR corresponding to each of the four colors.

The ink discharged by the print head 81 is not limited to the inks of the above-described colors, and may be, for example, light cyan, light magenta, orange, green, gray, light gray, white, metallic or the like. In addition to the ink IK, the print head 81 may be configured to discharge a penetrant onto the print medium W. The penetrant is a liquid that promotes penetration of the ink IK, which has adhered to the surface of the print medium W, to the back surface. In this case, the print head 81 discharges the penetrant toward the print medium W at the same time as the discharge of the ink IK or at a timing different from the discharge of the ink IK.

The carriage 82 is positioned in any of a non-printing area A1, a printing area A2, or a non-printing area A3 in the intersecting direction K. In addition, the non-printing areas A1 and A3 are areas outside the printing area, which is the outer side of the printing area A2 in the intersecting direction K.

The non-printing area A1 is an area in which the print head 81 cannot discharge the ink IK for the purpose of image formation. The non-printing area A1 is an area adjacent to the printing area A2 on the right of the printing area A2. The non-printing area A1 is an area that does not include the print medium W placed on the transport belt 4. Therefore, the print medium W is not positioned at a position corresponding to the print head 81 mounted on the carriage 82 positioned in the non-printing area A1. Note that a case where the carriage 82 is positioned in the non-printing area A1 means a case where the nozzle row NzR positioned on the leftmost among the nozzle rows NzR included in the print head 81 is positioned in the non-printing area A1 in the intersecting direction K. A maintenance mechanism that executes maintenance with respect to the print head 81 may be provided in the non-printing area A1.

The printing area A2 is an area in which the print head 81 discharges the ink IK for the purpose of image formation. The printing area A2 is an area pinched between the non-printing areas A1 and A3 in the intersecting direction K and is adjacent to the non-printing areas A1 and A3.

The non-printing area A3 is an area in which the print head 81 cannot discharge the ink IK for the purpose of image formation. The non-printing area A3 is an area adjacent to the printing area A2 on the left of the printing area A2. The non-printing area A3 is an area that does not include the print medium W placed on the transport belt 4. Therefore, the print medium W is not positioned at a position corresponding to the print head 81 mounted on the carriage 82 positioned in the non-printing area A3. Note that a case where the carriage 82 is positioned in the non-printing area A3 means a case where the nozzle row NzR positioned on the rightmost among the nozzle rows NzR included in the print head 81 is positioned in the non-printing area A3 in the intersecting direction K. A maintenance mechanism that executes maintenance with respect to the print head 81 may be provided in the non-printing area A3 instead of the non-printing area A1.

When discharging the ink onto the print medium W to form an image, the carriage 82 scans in the intersecting direction K starting from scan start positions KI1 and KI3. The scan start position KI1 is a position in the intersecting direction K and is a position in the non-printing area A1 when the carriage 82 starts scanning to the left. The carriage 82 positioned at the scan start position KI1 is positioned in the non-printing area A1. The scan start position KI3 is a position in the intersecting direction K and is a position in the non-printing area A3 when the carriage 82 starts scanning to the right. The carriage 82 positioned at the scan start position KI3 is positioned in the non-printing area A3.

For example, it is assumed that the carriage 82 is positioned at the scan start position KI1. When printing on the print medium W, the carriage 82 scans leftward and moves to the scan start position KI3. The print head 81 discharges an appropriate amount of ink from an appropriate nozzle at an appropriate timing in the printing area A2 while the carriage 82 scans to the left to form an image in the printing area A2. As a result, in the print medium W, printing is performed in an area that extends in the transport direction H by the length of the nozzle row NzR of the print head 81. For example, similar to multi-pass printing, when the nozzle rows NzR are divided into a plurality of nozzle groups for printing in the transport direction H, printing is performed in an area that extends in the transport direction H by the length of one divided nozzle group.

After the carriage 82 moves to the scan start position KI3, the transport belt 4 transports the print medium W in the transport direction H by a distance corresponding to the length of the nozzle row NzR according to the control of the control section 100. For example, similar to multi-pass printing, when the nozzle rows NzR are divided into a plurality of nozzle groups for printing in the transport direction H, the transport belt 4 transports the print medium W in the transport direction H by the distance corresponding to the length of one divided nozzle group.

Next, after transport by the transport belt 4, the carriage 82 switches the scanning direction to the right and scans from the scan start position KI3 toward the scan start position KI1. The print head 81 discharges an appropriate amount of ink from an appropriate nozzle at an appropriate timing in the printing area A2 while the carriage 82 scans to the right to form an image in the printing area A2. As a result, printing is performed in an area that extends in the transport direction H by the length of the nozzle row NzR, upstream of the area printed during the scanning to the right in the transport direction H. For example, similar to multi-pass printing, when the nozzle rows NzR are divided into a plurality of nozzle groups for printing in the transport direction H, printing is performed in an area that extends in the transport direction H by the length of one divided nozzle group.

In this manner, the carriage 82 and the print head 81 repeatedly perform the processing of scanning and printing leftward and the processing of scanning and printing rightward as many times as necessary for printing.

Returning to the description of FIG. 1, the printing unit 8 includes the gap adjusting mechanism 83. The gap adjusting mechanism 83 is a mechanism that adjusts a workpiece gap WG that is a distance between the print medium W and a nozzle surface 81A of the print head 81. The gap adjusting mechanism 83 is coupled to the carriage 82 and adjusts the workpiece gap WG by moving the carriage 82 in the up-down direction according to the control of the control section 100.

The printer 1 includes a drying unit 9. The drying unit 9 is provided upstream of the winding device 5 and downstream of the driven roller 10C in the transport direction H.

In addition, the drying unit 9 may not be provided downstream of the driven roller 10C as long as the drying unit 9 is provided upstream of the winding device 5 and downstream of the print head 81 in the transport direction H. The drying unit 9 has, for example, a chamber that accommodates the print medium W and a heater that is disposed inside the chamber, and dries the undried ink IK on the print medium W by the heat of the heater.

Next, the functional configuration of the printer 1 will be described.

Figure 4:
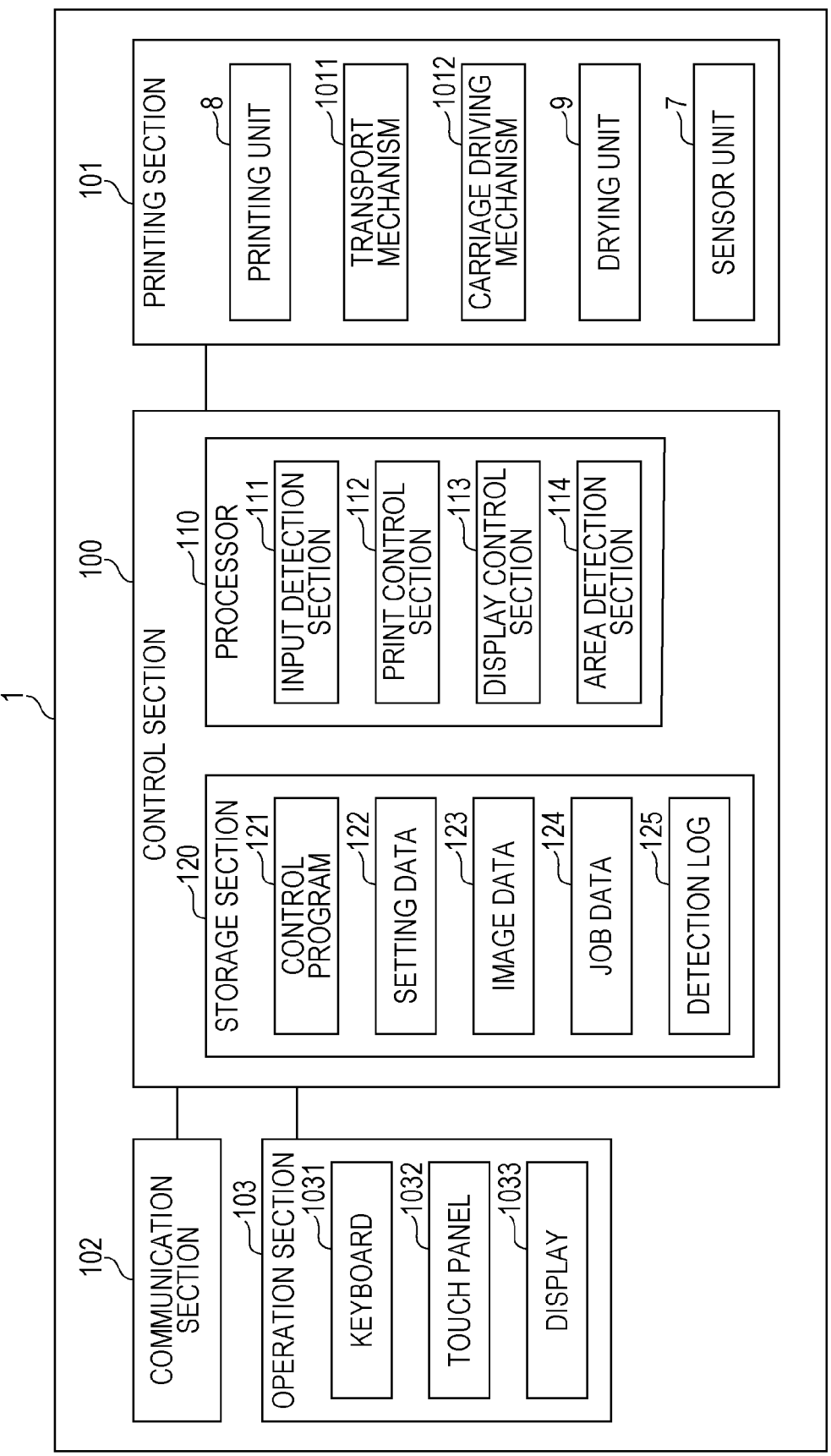
FIG. 4 is a block diagram illustrating a functional configuration of the printer.

FIG. 4 is a block diagram illustrating the functional configuration of the printer 1.

The printer 1 includes the control section 100.

The control section 100 includes a processor 110 that executes programs, such as a CPU or an MPU, and a storage section 120, and controls each section of the printer 1. The control section 100 executes various types of processing by cooperation of hardware and software such that the processor 110 reads a control program 121 stored in the storage section 120 and executes the processing. The control program 121 corresponds to an example of the program. The processor 110 functions as an input detection section 111, a print control section 112, a display control section 113, and an area detection section 114 by reading and executing the control program 121. Details of the functional blocks will be described later.

The storage section 120 has a storage area that stores a program executed by the processor 110 and data processed by the processor 110. The storage section 120 stores the control program 121 executed by the processor 110 and setting data 122 including various setting values related to the operation of the printer 1. The storage section 120 has a non-volatile storage area that stores programs or data in a non-volatile manner. In addition, the storage section 120 may include a volatile storage area and may be configured to temporarily store a program executed by the processor 110 or data to be processed.

The printer 1 includes a printing section 101. The printing section 101 includes the printing unit 8, the transport mechanism 1011, a carriage driving mechanism 1012, the drying unit 9, and the sensor unit 7. The transport mechanism 1011 is a mechanism for transporting the print medium W, and in addition to the delivery device 2, the driven rollers 10A, 10B, and 10C, the transport rollers 3A and 3B, the transport belt 4, and the winding device 5, the transport mechanism 1011 includes a motor that drives theses members. The carriage driving mechanism 1012 is a mechanism that reciprocates the carriage 82 in the scanning direction, and includes, for example, a motor as a driving source, a guide member that guides the movement of the carriage 82, a gear or a link that transmits the power of the motor to the carriage 82, and the like.

The printer 1 includes a communication section 102.

The communication section 102 is configured of communication hardware such as a connector and an interface circuit according to a predetermined communication standard, and communicates with an external apparatus of the printer 1 according to the control of the control section 100. The external apparatus of the printer 1 is, for example, a computer or a server apparatus. When the communication section 102 receives image data 123 from the external apparatus, the control section 100 stores the received image data 123 in the storage section 120. When the communication section 102 receives job data 124 for instructing printing from the external apparatus, the control section 100 stores the received job data 124 in the storage section 120.

The printer 1 includes an operation section 103. The operation section 103 includes a keyboard 1031, a touch panel 1032, and a display 1033. The operation section 103 may be configured to include only one of the keyboard 1031 and the touch panel 1032. The display 1033 corresponds to an example of the display section. The keyboard 1031 has a plurality of keys operated by an operator, and outputs operation data indicating the operated keys to the control section 100. The display 1033 has a display screen such as a liquid crystal display (LCD) and displays an image according to the control of the control section 100. The touch panel 1032 is disposed so as to overlap the display screen of the display 1033, detects a touch operation on the display screen, and outputs operation data indicating the touch position to the control section 100.

The control section 100 includes the input detection section 111, the print control section 112, the display control section 113, and the area detection section 114.

The storage section 120 stores the control program 121, the setting data 122, the image data 123, the job data 124, and a detection log 125. The control program 121 is a program executed by the processor 110, and the setting data 122 includes setting values related to the execution of the control program 121.

The input detection section 111 detects the input operation of the operator based on the operation data input from the keyboard 1031 and the touch panel 1032, and acquires the input content. When the data received via the communication section 102 is analyzed and the image data 123 is received, the input detection section 111 stores the image data 123 in the storage section 120. Further, when the job data 124 which is the data related to print job IJ is received, the input detection section 111 stores the job data 124 in the storage section 120.

The image data 123 is data of an image printed by the print head 81 on the print medium W, and the storage section 120 can store a plurality of pieces of image data 123.

The print control section 112 controls the printing section 101 according to the job data 124, and causes the printing section 101 to execute printing on the print medium W.

The job data 124 is data for the print control section 112 to execute printing in units of a job group 130 including one or a plurality of print jobs IJ. Here, the job group 130 will be described.

Figure 5:
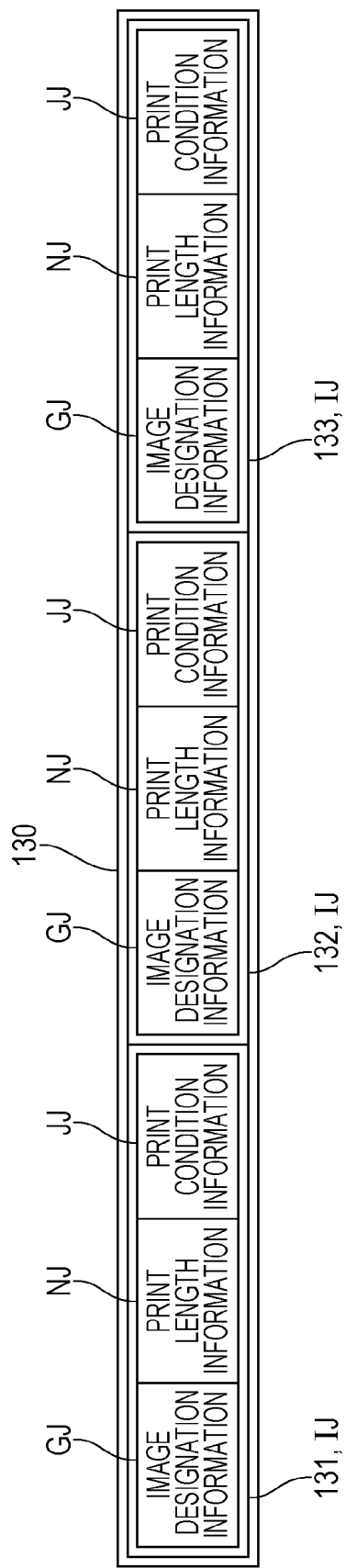
FIG. 5 is a schematic diagram illustrating a configuration of a job group.

FIG. 5 is a schematic view illustrating the configuration of the job group 130.

There is no limit to the number of print jobs IJ included in the job group 130 executed by the printer 1, and the job group 130 illustrated in FIG. 5 exemplifies a case including three print jobs 131, 132, and 133. The arrangement order of the print jobs 131, 132, and 133 in the job group 130 indicates the order in which the print control section 112 executes printing. Therefore, the print jobs 131, 132, and 133 are executed by the print control section 112 in the order of arrangement in the job group 130.

The print job 131 includes image designation information GJ, print length information NJ, and print condition information JJ. The image designation information GJ is information for designating an image to be printed on the print medium W, and designates any of the image data 123 stored in the storage section 120. For example, when the storage section 120 stores each of the plurality of pieces of image data 123 as one file, the image designation information GJ includes a file name or a file path that designates any one piece of the image data 123.

The print length information NJ is information for designating the print length that is the length for printing the image designated by the image designation information GJ. The print length designates the size of the print medium W on which the image of the print job 131 is printed in the transport direction H, for example, in units of meters. When the print length is greater than the image size of the image data 123, the print control section 112 repeats the image of the image data 123 and prints the image on the print medium W. Therefore, the image data 123 may be data of an image smaller than the print length. Further, the image data 123 may be data of an image smaller than the size of the print medium W in the intersecting direction K, that is, the width of the print medium W. In this case, the print control section 112 also repeatedly prints the image of the image data 123 in the width direction of the print medium W.

The print condition information JJ is information indicating print conditions when the print head 81 prints an image. For example, the print condition indicated by the print condition information JJ includes the print resolution of the image printed by the print head 81 or the workpiece gap WG. Further, the print condition indicated by the print condition information JJ may include print density, information for designating the ink discharge amount per unit area, and the like.

The print jobs 131, 132, and 133 included in the job group 130 include the image designation information GJ, the print length information NJ, and the print condition information JJ, respectively. Therefore, the print control section 112 can print different images in the print jobs 131, 132, and 133 included in the job group 130 with different print lengths and print conditions.

The print control section 112 continuously executes the print jobs 131, 132, and 133 included in the job group 130. Therefore, different images designated by each of the print jobs 131, 132, and 133 are connected and printed on the long print medium W. Therefore, for example, when printing a plurality of images in order, a blank does not occur at the position where the images are switched or the printing operation does not stop, and thus, the print control section 112 can reduce the waste of the print medium W while suppressing deterioration of productivity of the printer 1, and can efficiently performing printing.

The job data 124 can be configured to include the data of the plurality of job groups 130.

The print control section 112 refers to the job data 124 and acquires the data of the job group 130 designated by the operation of the operation section 103. The print control section 112 prints the print jobs 131, 132, and 133 included in the designated job group 130 in the order included in the job group 130.

The display control section 113 controls the display 1033 to display various images. The display control section 113 of the embodiment displays a print status screen 300 on the display 1033. The print status screen 300 will be described later.

The area detection section 114 determines the presence or absence of the non-printable area AF in the print medium W based on the detection value input from the sensor unit 7. In addition, when it is determined that the print medium W has the non-printable area AF, the area detection section 114 detects the position of the non-printable area AF on the print medium W, the length of the non-printable area AF in the transport direction H, and the height of the non-printable area AF based on the detection value input from the sensor unit 7. The area detection section 114 stores the detection log 125 including information indicating the position of the detected non-printable area AF, information indicating the length of the detected non-printable area AF in the transport direction H, and the height of the detected non-printable area AF, in the storage section 120. In addition to these pieces of information, the detection log 125 includes, for example, information indicating the start time at which the sensor unit 7 starts detection of the non-printable area AF.

For example, when detecting the length of the non-printable area AF in the transport direction H, the area detection section 114 counts the period during which the sensor unit 7 detects the seam Se based on the detection value input from the sensor unit 7. In addition, the area detection section 114 does not perform the count even when the sensor unit 7 detects the seam Se while the transport belt 4 stops the transport of the print medium W. Then, the area detection section 114 calculates the transport distance of the transport belt 4 corresponding to the counted period, and detects the calculated transport distance as the length of the non-printable area AF in the transport direction H. Note that this detection method is merely an example, and any detection method can be adopted.

Further, for example, when the detecting the position of the non-printable area AF on the print medium W, the area detection section 114 detects the position of the non-printable area AF on the print medium W based on the print start time of the job group 130, the transport distance of the transport belt 4 after the print of the job group 130 is started, the start time at which the sensor unit 7 starts detection of the non-printable area AF, and the length of the detected non-printable area AF in the transport direction H. Note that this detection method is merely an example, and any detection method can be adopted.

Next, the operation of the printer 1 will be described.

Figure 6A:
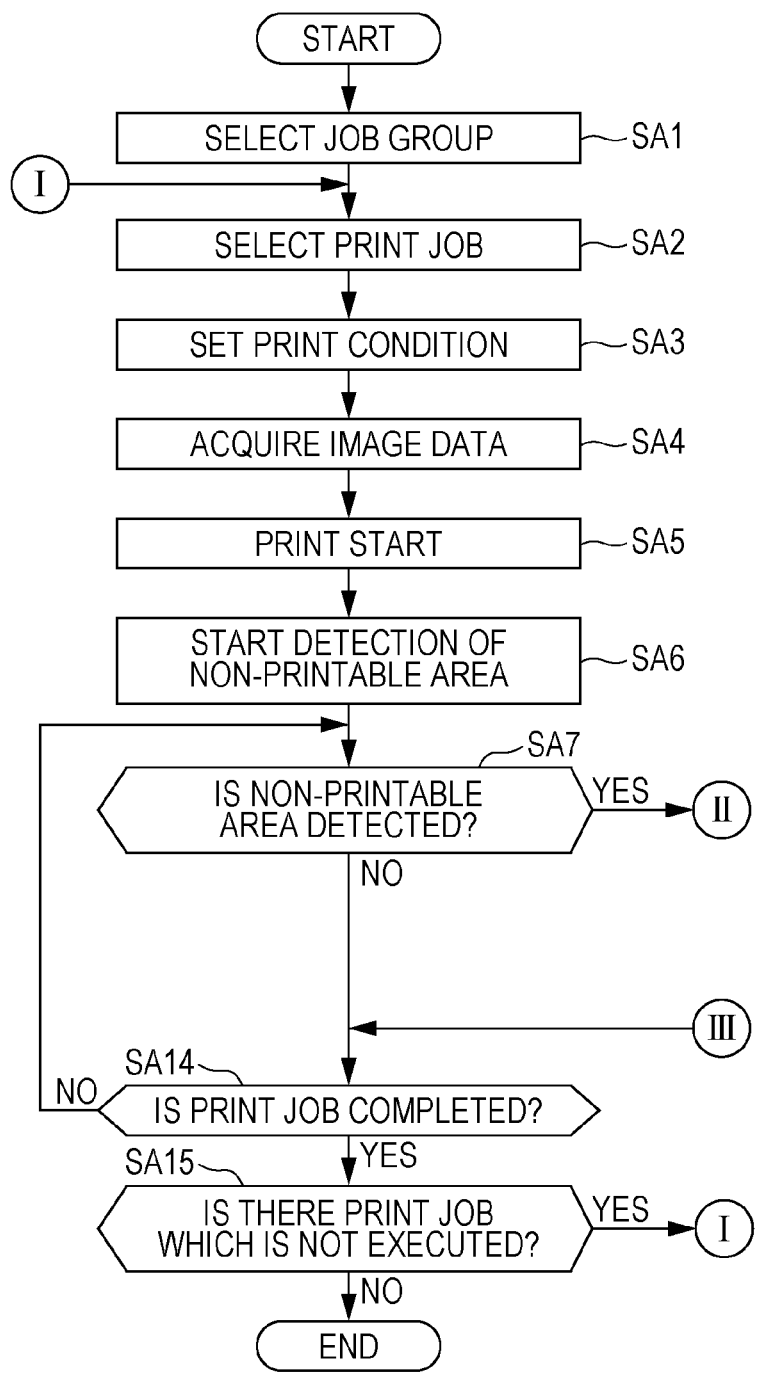
FIGS. 6A and 6B are flowcharts illustrating an operation of a printer according to a first embodiment.
Figure 6B:
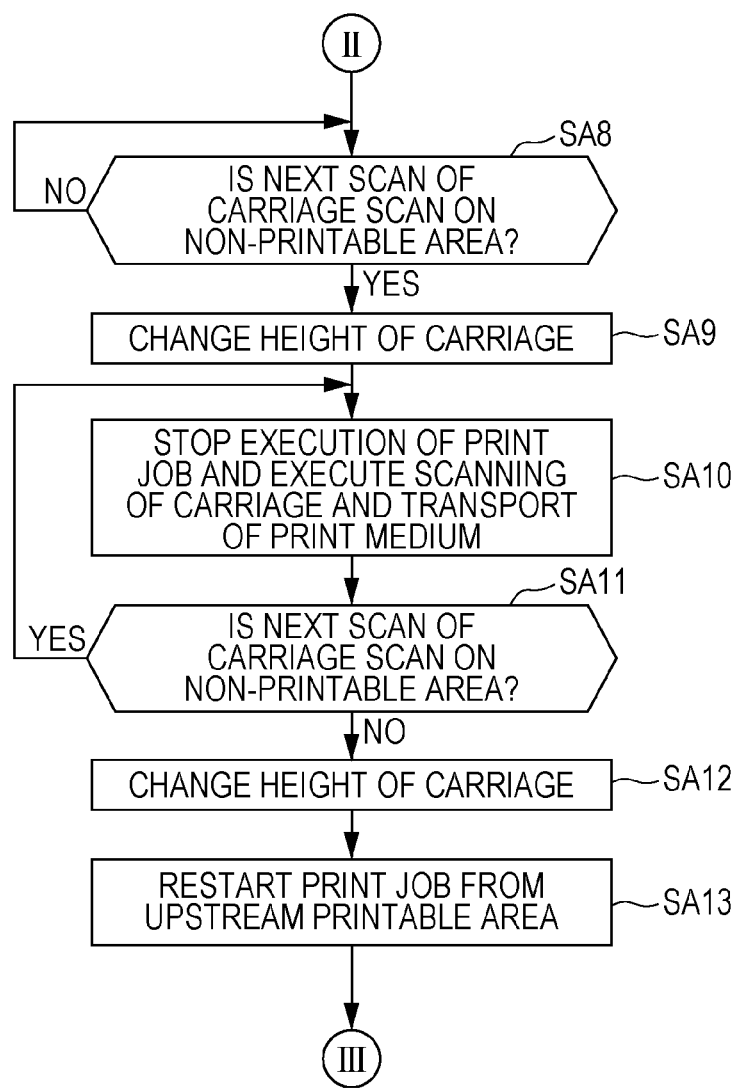

FIGS. 6A and 6B are flowcharts illustrating the operation of the printer 1 and illustrate the operation related to printing on the print medium W.

The print control section 112 selects the job group 130 to be executed from the job groups 130 included in the job data 124 according to the input operation detected by the operation section 103 (step SA1).

Next, the print control section 112 selects one print job IJ from the print jobs IJ included in the job group 130 selected in step SA1 according to the execution order of the print job IJ (step SA2).

Next, the print control section 112 acquires the print condition information JJ indicating the print condition of the print job IJ to be executed, and sets the print condition indicated by the acquired print condition information JJ (step SA3). Subsequently, the print control section 112 acquires the image data 123 designated by the image designation information GJ from the storage section 120 (step SA4).

Next, the print control section 112 controls the printing section 101 to start printing on the print medium W (step SA5), and in response to this, the area detection section 114 starts the detection of the non-printable area AF on the print medium W based on the signal output by the sensor unit 7 (step SA6).

The area detection section 114 determines whether or not the non-printable area AF on the print medium W was detected based on the detection value output by the sensor unit 7 (step SA7).

When it is determined that the area detection section 114 is not detecting the non-printable area AF (step SA7: NO), the print control section 112 determines whether or not the print job IJ is completed (step SA14).

Meanwhile, when it is determined that the area detection section 114 detected the non-printable area AF (step SA7: YES), it is determined whether or not the next scan of the carriage 82 is the scan on the non-printable area AF (step SA8).

When the next scan of the carriage 82 is the scan in which the most upstream nozzle moves on the non-printable area AF at least in the transport direction H, the print control section 112 makes a positive determination in step SA8. Note that the print control section 112 executes the processing of step SA8, for example, based on the transport distance of the print medium W transported by the transport mechanism 1011 after the start of printing, the position of the print head 81 in the transport direction H, the length of the nozzle row NzR, and the length of the non-printable area AF detected by the area detection section 114 in the transport direction H.

When it is determined that the next scan of the carriage 82 is not the scan on the non-printable area AF (step SA8: NO), the print control section 112 executes the processing of step SA8 again. The print control section 112 repeatedly performs the processing of scanning leftward by the carriage 82 for printing, the processing of transporting by the transport belt 4, and the processing of scanning rightward by the carriage 82 for printing, by the printing section 101 until making a positive determination in step SA8.

When it is determined that the next scan of the carriage 82 is the scan on the non-printable area AF (step SA8: YES), the print control section 112 controls the gap adjusting mechanism 83, moves the carriage 82 upward such that the workpiece gap WG is greater than the workpiece gap WG during the printing, and changes the height of the carriage 82 with respect to the print medium W (step SA9).

The print control section 112 changes the height of the carriage 82 when the carriage 82 is positioned in any of the non-printing areas A1 and A3. In the embodiment, a case where the height of the carriage 82 is changed when the carriage 82 is positioned at any of the scan start positions KI1 and KI3 is exemplified. This is because the print head 81 forms an image on the printing area A2 in the scan before the scan on the non-printable area AF.

Figure 7:
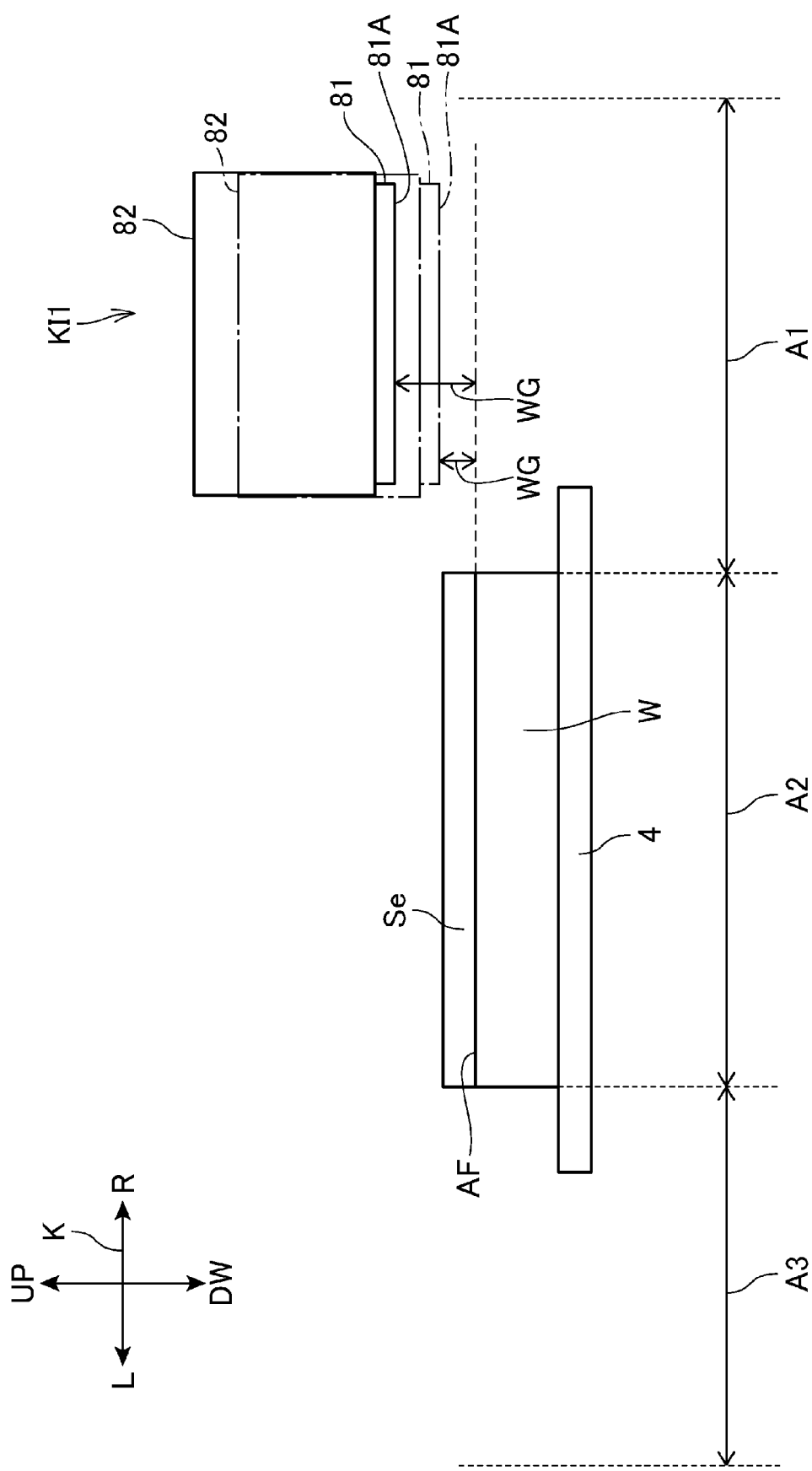
FIG. 7 is a view for describing a change in height of the carriage.

FIG. 7 is a view for describing a change in height of the carriage 82 with respect to the print medium W. FIG. 7 exemplifies a case where the height of the carriage 82 is changed at the scan start position KI1.

The carriage 82 and the print head 81, which are indicated by the one-dot chain line, indicate the carriage 82 and the print head 81 when the workpiece gap WG is set to "L1". In FIG. 7, the workpiece gap WG of "L1" is the workpiece gap WG included in the print conditions. Therefore, in FIG. 7, the positions of the carriage 82 and the print head 81, which are indicated by the one-dot chain line, are the positions when an image is formed on the print medium W.

The carriage 82 and the print head 81, which are indicated by the solid line, indicate the carriage 82 and the print head 81 when the workpiece gap WG is set to "L2", in step SA9. In FIG. 7, the workpiece gap WG of "L2" is wider than the workpiece gap WG of "L1" by the distance of "L3". In a case of FIG. 7, in step SA9, the gap adjusting mechanism 83 moves the carriage 82 upward by the distance of "L3". When moving the carriage 82 upward, the gap adjusting mechanism 83 moves the carriage 82 to the maximum movable position upward. Accordingly, in a case of FIG. 7, the maximum workpiece gap WG that can be set by the gap adjusting mechanism 83 is "L2".

Returning to the descriptions of FIGS. 6A and 6B, when controlling the gap adjusting mechanism 83 to change the height of the carriage 82, the print control section 112 stops the execution of the print job IJ and executes the scanning of the carriage 82 and the transport of the print medium W by the transport belt 4 (step SA10). In the processing of step SA10, while the discharge of the ink IK based on the print job IJ is not executed, the scanning of the carriage 82 and the transport of the print medium W by the transport belt 4 are executed the same as the execution of the print job IJ.

In this manner, the print control section 112 can separate the print head 81 from the print medium W by changing the height of the carriage 82 such that the workpiece gap WG is greater than the workpiece gap WG during the printing. Therefore, the print control section 112 can avoid contact between the print head 81 and the print medium W, that is, contact between the print head 81 and the seam Se in the embodiment.

In step SA10, the print control section 112 may execute the flushing operation by the print head 81 with respect to the non-printable area AF. The flushing operation is an operation that prevents the ink IK thickened by forcibly discharging the ink IK accumulated in the nozzle from accumulating in the nozzle and prevents discharge failure due to nozzle clogging. In step SA10, the print control section 112 specifies the nozzle that moves on the non-printable area AF for each scan of the carriage 82, and executes the flushing operation for the specified nozzle. Accordingly, the print control section 112 can prevent the thickened ink IK from accumulating in the nozzles while avoiding the contact between the print head 81 and the print medium W, and can prevent the nozzle clogging due to avoiding the contact between the print head 81 and the print medium W.

In step SA10, the print control section 112 micro vibrates each nozzle of the print head 81. The micro vibration here is to vibrate the piezo element in a range where the ink IK is not discharged from a discharge port of the nozzle. Accordingly, the print control section 112 can stir the ink that accumulates in the nozzles while avoiding the contact between the print head 81 and the print medium W, and can suppress the increase in the viscosity of the ink. Therefore, the print control section 112 can prevent nozzle clogging due to avoiding the contact between the print head 81 and the print medium W.

Next, the print control section 112 determines whether or not the next scan of the carriage 82 is a scan on the non-printable area AF (step SA11). More specifically, in step SA11, the print control section 112 determines whether or not the next scan of the carriage 82 is the scan in which the most downstream nozzle moves on the non-printable area AF at least in the transport direction H.

When it is determined that the next scan of the carriage 82 is the scan on the non-printable area AF (step SA11: YES), the print control section 112 executes the processing of steps SA10 and SA11 again. In other words, the print control section 112 repeats the scanning of the carriage 82 and the transport of the print medium W by the transport belt 4 while stopping execution of the print job IJ until a negative determination is made in step SA11.

Meanwhile, when it is determined that the next scan of the carriage 82 is not the scan on the non-printable area AF (step SA11: NO), the print control section 112 controls the gap adjusting mechanism 83, moves the carriage 82 downward such that the workpiece gap WG is included in the print conditions, and changes the height of the carriage 82 with respect to the print medium W (step SA12). The timing at which the height of the carriage 82 is changed is not limited to the timing at which the carriage 82 is positioned in any of the non-printing areas A1 and A3, and may be any timing after the negative determination is made in step SA11.

For example, in a case of FIG. 7, in step SA11, the print control section 112 controls the gap adjusting mechanism 83 to move the carriage 82 downward by the distance of "L3" to set the workpiece gap WG from "L2" to "L1".

Next, the print control section 112 restarts the print job IJ from the upstream printable area AK-J (step SA13). In other words, in step SA13, the print control section 112 continues the printing executed on the downstream printable area AK-K from the upstream printable area AK-J.

In step SA14, the print control section 112 determines whether or not the print job IJ is completed (step SA14). When the printing of the print job IJ is not completed (step SA14: NO), the control section 100 returns to step SA7.

When the print job is completed (step S14: YES), the print control section 112 determines whether or not there is a print job IJ that has not been executed in the job group 130 selected in step SA1 (step SA15). When there is the print job IJ that has not been executed (step SA15: YES), the control section 100 returns to step SA2. When there is no print job IJ that has not been executed (step SA15: NO), the control section 100 ends this processing. Note that the printed product obtained by the operation of FIGS. 6A and 6B is longer than the total print length of all print jobs IJ by the number of non-printable areas AF.

The printer 1 executes the operation related to the display of the print status screen 300 in parallel with the operation illustrated in FIGS. 6A and 6B.

Figure 8:
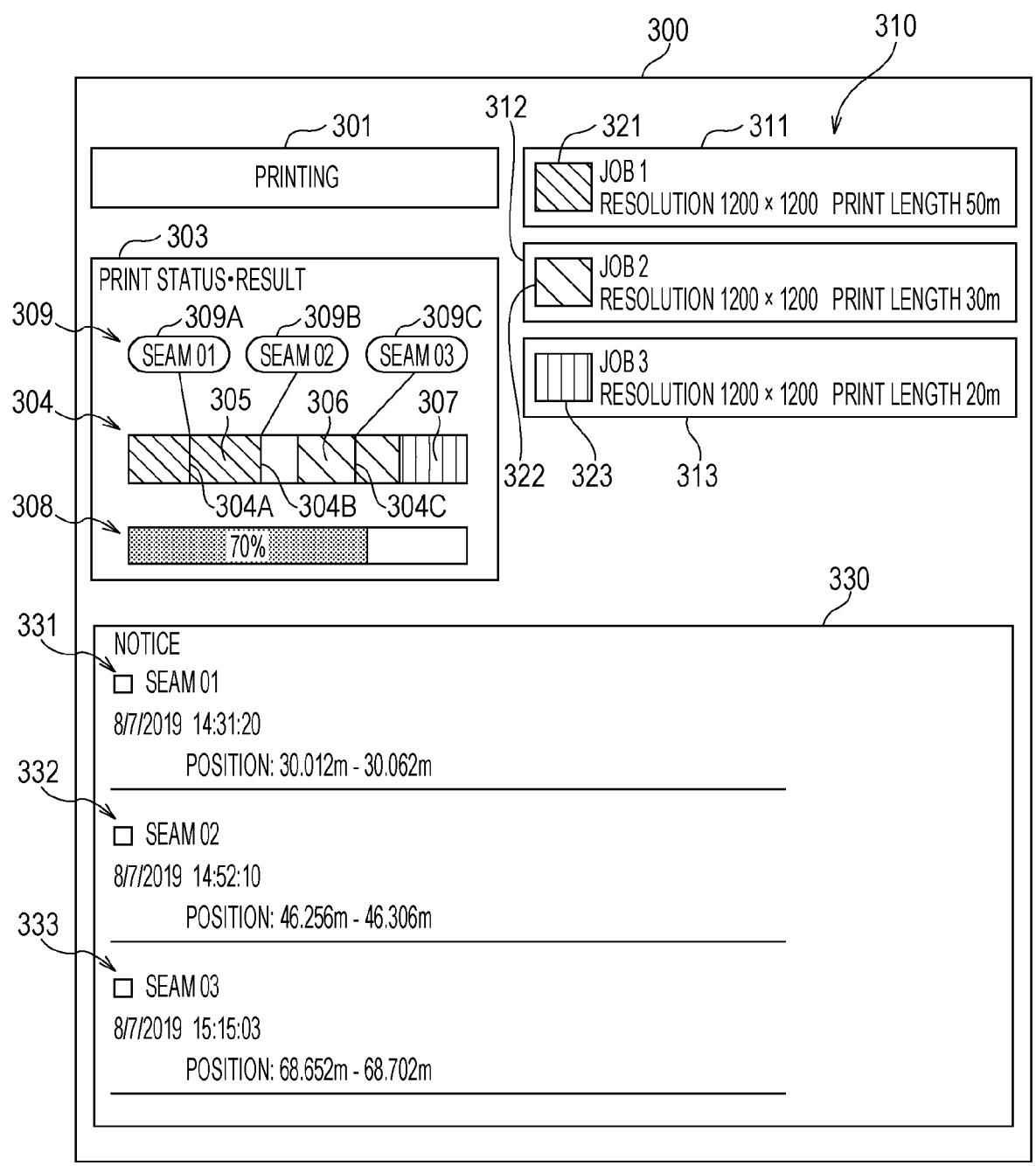
FIG. 8 illustrates an example of a print status screen.

FIG. 8 is a view illustrating an example of the print status screen 300 displayed on the display 1033.

The print status screen 300 is a screen displayed by the display control section 113 on the display 1033 while the print control section 112 is executing printing.

A status display section 301, a result display section 303, the print job display section 310, and a notification display section 330 are arranged on the print status screen 300.

The status display section 301 is a display area that displays the status of the operation of the printer 1. The status of the printer 1 may be, for example, printing, waiting for printing, or the like. In the example of FIG. 5, since the print control section 112 illustrates a state where the printing is being executed, the status display section 301 displays that printing is in progress.

The result display section 303 is an area for displaying the printing status and the result of the printing operation. The job group 130 which is being executed by the print control section 112, or a job group image 304 and a progress status image 308 corresponding to the executed job group 130 are arranged in the result display section 303.

The job group image 304 includes symbol images 305, 306, and 307 indicating the print jobs IJ that form the job group 130. Each of the symbol images 305, 306, and 307 illustrates each of the print jobs IJ included in the job group 130. Each of the symbol images 305, 306, and 307 is a thumbnail image of an image printed by the print job IJ. In other words, the symbol images 305, 306, and 307 are reduced images of the images of the image data 123 printed on the print medium W.

The symbol images 305, 306, and 307 are displayed in a size corresponding to the print length of each print job IJ. The display sizes of the symbol images 305, 306, and 307 have the same ratio as the print length of the print job IJ to which each symbol image corresponds. Further, the display control section 113 may fixe the entire display size of the job group image 304, proportionally distribute the display size of the job group image 304 by the print length of each print job IJ included in the job group 130, and determine the display size of the symbol images 305, 306, and 307. The arrangement order of the symbol images 305, 306, and 307 in the job group image 304 is the same as the execution order of the print jobs IJ in the job group 130. For example, the symbol image 305 positioned on the leftmost side of the job group image 304 indicates the print job IJ of which the execution order is first.

The progress status image 308 is an image illustrating the progress status of the job group 130, and is displayed in the same display size as that of the job group image 304 according to the control of the display control section 113. The progress status image 308 is, for example, an image which is in a progress bar mode and illustrates a part that has completed printing by the print head 81 among all of the job groups 130 in a different display mode. Further, as illustrated in FIG. 8, the progress status image 308 may display a numerical value indicating a proportion of the part that has completed the printing among all of the job groups 130. In this case, the display control section 113 indicates the proportion of completed printing with reference to the length of the print medium W in the transport direction H.

Further, a seam display section 309 is disposed on the result display section 303. The seam display section 309 displays information related to the non-printable area AF including the seam Se detected by the sensor unit 7 during the printing. The seam display section 309 is displayed based on the position of the non-printable area AF on the print medium W detected by the area detection section 114.

Icons 309A, 309B, and 309C indicating one non-printable area AF detected by the sensor unit 7 are displayed on the seam display section 309, respectively. Position displays 304A, 304B, and 304C indicating the positions of non-printable areas are displayed in the job group image 304 in association with the respective icons 309A, 309B, and 309C.

The position display 304A indicates the position of the non-printable area AF indicated by the icon 309A. Similarly, the position displays 304B and 304C indicate the positions of the non-printable areas AF indicated by the icons 309B and 309C. The display positions of the position displays 304A, 304B, and 304C on the job group image 304 indicate the positions of the non-printable areas AF in the transport direction H. Therefore, the operator can easily grasp the position of the non-printable area AF with reference to the print length of each print job IJ included in the job group 130 by the position displays 304A, 304B, and 304C.

The print job display section 310 is an area for displaying information related to each print job IJ included in the job group 130 displayed on the result display section 303. In the example of FIG. 8, the print job display section 310 includes print job content display sections 311, 312, and 313 corresponding to the three print jobs IJ. Each of the print job content display sections 311, 312, and 313 corresponds to one print job IJ, and the arrangement order of the print job content display sections 311, 312, and 313 in the print job display section 310 is an order which is the same as the execution order of the print jobs IJ.

The print job content display section 311 includes a thumbnail image 321 of an image printed by the print job IJ. Further, in the print job content display section 311, characters indicating print conditions and print lengths are arranged. Similarly, the print job content display sections 312 and 313 include thumbnail images 322 and 323 of images to be printed by the print job, and include characters indicating print conditions and print lengths.

Figure 9:
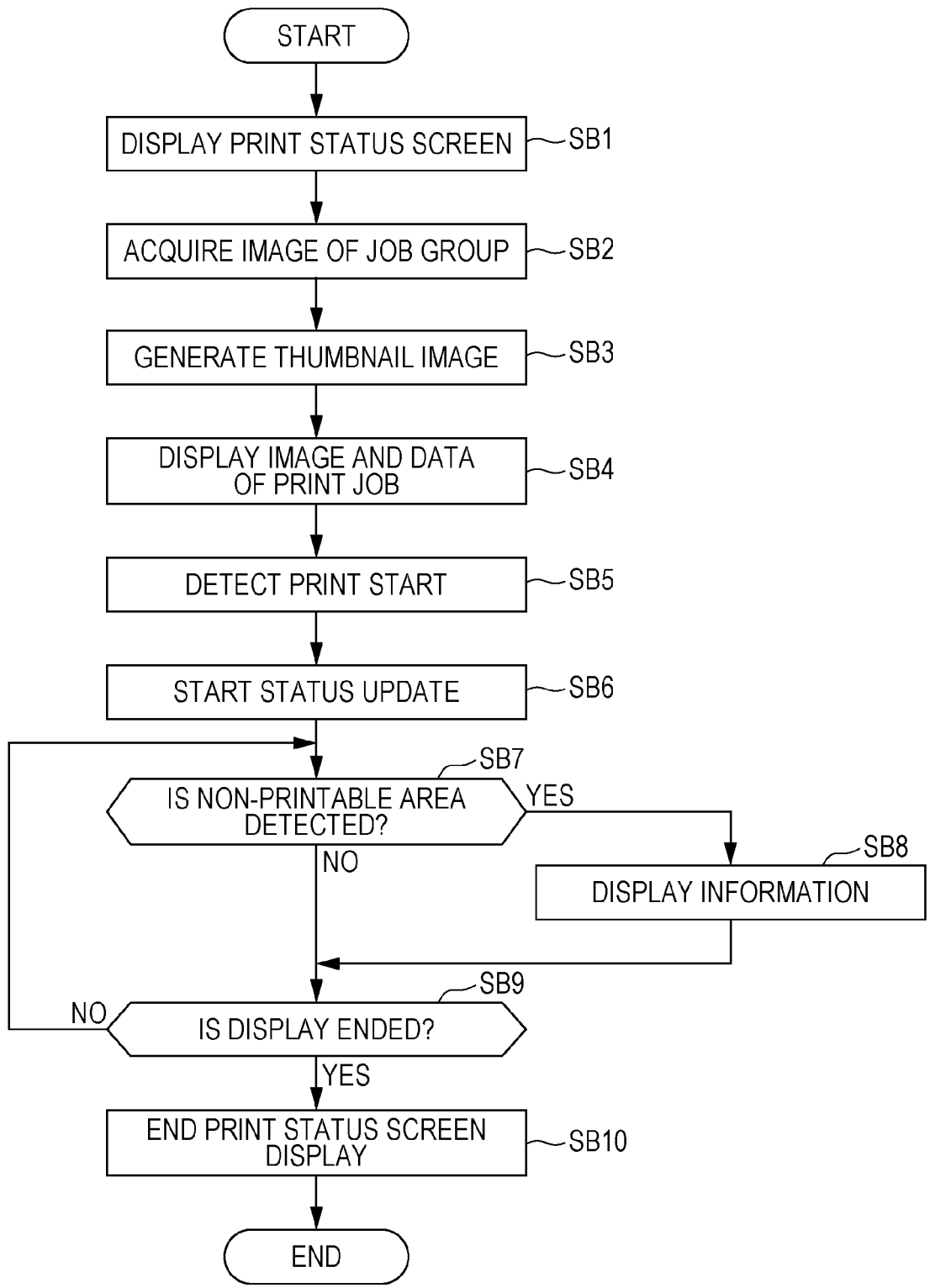
FIG. 9 is a flowchart illustrating the operation of the printer.

The notification display section 330 is an area for displaying information that should be notified to the operator regarding the printing executed by the print control section 112. The notification display section 330 displays, for example, area-related information related to the non-printable area AF detected by the area detection section 114. In the example of FIG. 9, area-related information 331, 332, and 333 are displayed on the notification display section 330. These area-related information 331, 332, and 333 are displayed based on the detection log 125 stored in the storage section 120.

The area-related information 331 includes the start time at which detection of the non-printable area AF is started and the position of the non-printable area AF on the print medium W, with respect to the non-printable area AF indicated by the icon 309A. The area-related information 332 and 333 respectively include the start time at which detection of the non-printable area AF is started and the position of the non-printable area AF on the print medium W, with respect to the non-printable area AF indicated by the icons 309B and 309C. The area-related information 331, 332, and 333 may include, for example, a plurality of pieces of other information such as information indicating the length of the non-printable area AF in the transport direction H or information indicating the height of the non-printable area AF.

FIG. 9 is a flowchart illustrating the operation of the printer 1 and illustrates the operation related to display on the print status screen 300.

The display control section 113 displays the print status screen 300 (step SB1), and acquires the image data 123 of the print job IJ included in the job group 130 selected by the print control section 112 in step SA1 from the storage section 120 (step SB2).

The display control section 113 generates a thumbnail image from the image data 123 acquired in step SB2 (step SB3), and displays the generated thumbnail image and the data of each print job IJ in the print job content display sections 311, 312, and 313 (step SB4). The data of each print job includes the print condition information JJ, the print length information NJ, and the like.

When it is detected that printing was started by the print control section 112 (step SB5), the display control section 113 starts the processing of updating the display of the result display section 303 and the notification display section 330 (step SB6).

The display control section 113 determines whether or not the non-printable area AF is detected by the area detection section 114 (step SB7). When the non-printable area AF is detected (step SB7: YES), the display control section 113 displays information related to the detected non-printable area AF on the result display section 303 and the notification display section 330 (step SB8), and proceeds to step SB9. When it is determined that the area detection section 114 is not detecting the non-printable area AF (step SB7: NO), the display control section 113 proceeds to step SB9.

In step SB9, the display control section 113 determines whether or not to end the display of the print status screen 300 (step SB9). The print status screen 300 can be displayed not only while the printing is being executed by the print control section 112 but also after the printing of the job group 130 is ended. In step SB9, the display control section 113 makes a positive determination, for example, when it is instructed to end the display of the print status screen 300 by the input of the operation section 103.

When the display of the print status screen 300 is not ended (step SB9: NO), the display control section 113 returns to step SB7. When the display of the print status screen 300 is ended (step SB9: YES), the display control section 113 ends the display of the print status screen 300 (step SB10) and ends this processing.

The following effects can be obtained by displaying the print status screen 300.

In general, when the print medium W printed by the printer 1 is subsequently processed or shipped, work for confirming the print status is performed. In general work, the printing status is confirmed by visually searching for a place which is not printed due to the seam Se. However, when the print medium W is a fabric product used for manufacturing clothing ornament or interior products, the length of the print medium W and the print length to be printed by the printer 1 become long. Therefore, the print medium W after printing is wound by the winding device 5 and cannot be easily handled by a person in terms of weight and size. Therefore, the work labor of unfolding the print medium W wound by the winding device 5 and visually confirming the state is large. However, the display of the print status screen 300 allows the operator to easily grasp at which position on the print medium W the seam Se exists and at which position on the print medium W printing was not performed. Accordingly, the printer 1 can reduce the work load after printing and improve efficiency.

Second Embodiment

Next, a second embodiment will be described.

The second embodiment is different from the first embodiment in the operation of the printer 1 in printing.

Figure 10A:
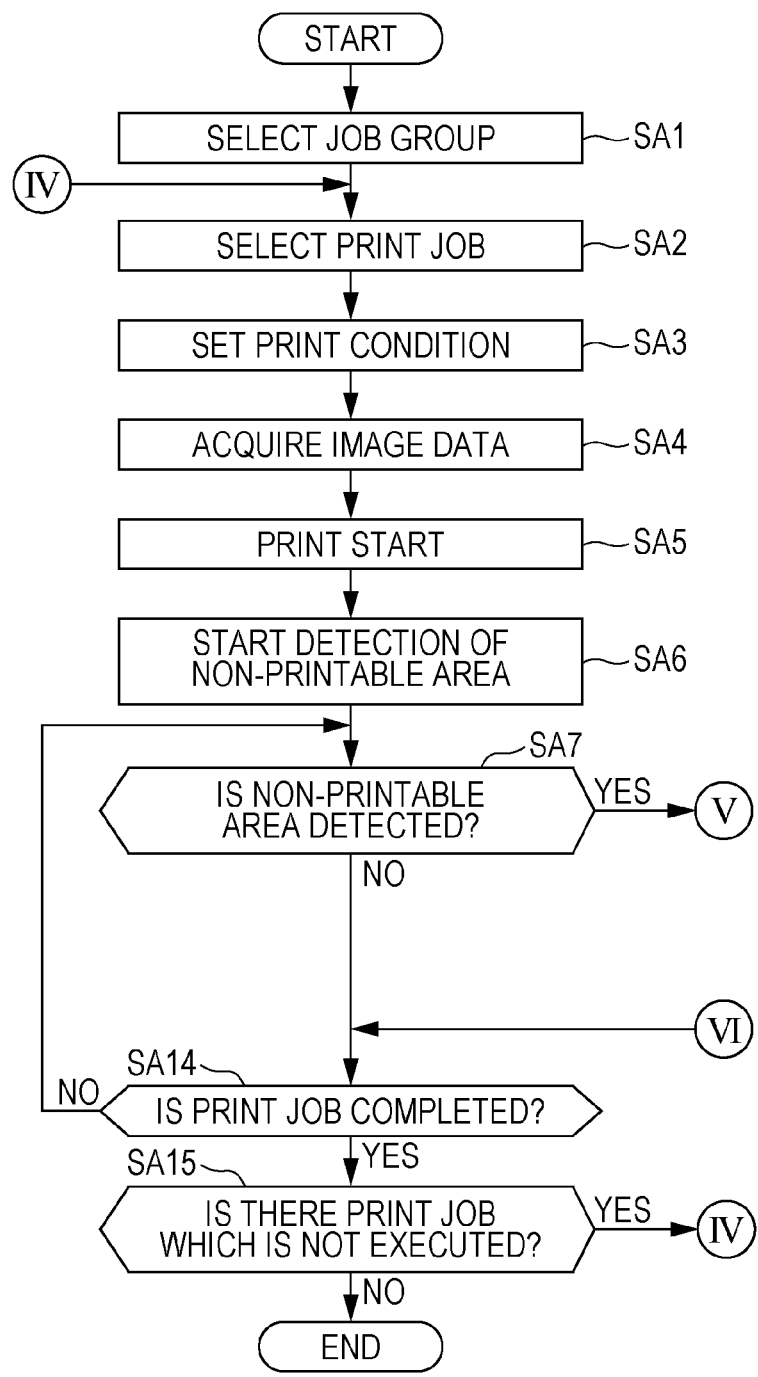
FIGS. 10A and 10B are flowcharts illustrating an operation of a printer according to a second embodiment.
Figure 10B:
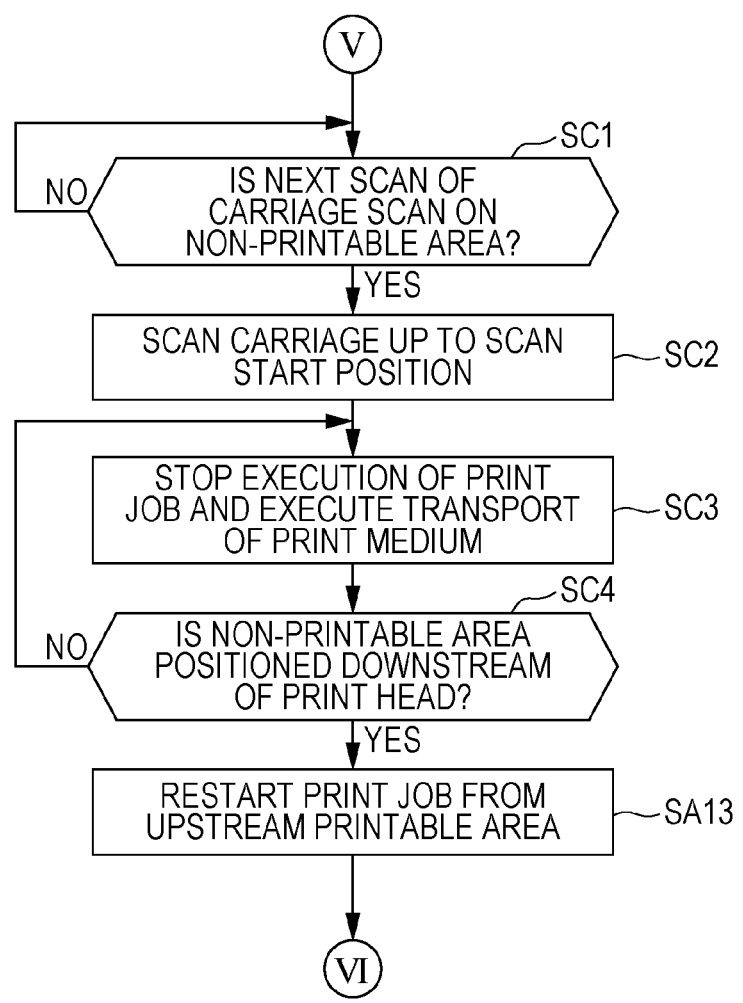

FIGS. 10A and 10B are flowcharts illustrating the operation of the printer 1 according to the second embodiment and illustrate the operation related to printing on the print medium W.

In the flowcharts illustrated in FIGS. 10A and 10B, the same steps as those in the flowcharts illustrated in FIGS. 6A and 6B will be given the same step numbers, and the detailed descriptions thereof will be omitted.

When it is determined that the area detection section 114 detected the non-printable area AF (step SA7: YES), the print control section 112 determines whether or not the next scan of the carriage 82 is the scan on the non-printable area AF (step SC1). When the next scan of the carriage 82 is the scan in which the most upstream nozzle moves on the non-printable area AF at least in the transport direction H, the print control section 112 makes a positive determination in step SC1.

When it is determined that the next scan of the carriage 82 is not the scan on the non-printable area AF (step SC1: NO), the print control section 112 executes the processing of step SC1 again. Then, the print control section 112 repeatedly performs the processing of scanning leftward by the carriage 82 for printing, the processing of transporting by the transport belt 4, and the processing of scanning rightward by the carriage 82 for printing, by the printing section 101 until making a positive determination in step SC1.

When it is determined that the next scan of the carriage 82 is the scan on the non-printable area AF (step SC1: YES), the print control section 112 causes the carriage 82 to scan at any of the scan start positions KI1 and KI3 (step SC2). In addition, when the scanning direction of the carriage 82 at the time of determination in step SC1 is the right direction, the print control section 112 causes the carriage 82 to scan so as to be positioned at the scan start position KI1. Then, when the scanning direction of the carriage 82 at the time of determination in step SC1 is the left direction, the print control section 112 causes the carriage 82 to scan so as to be positioned at the scan start position KI3.

Next, the print control section 112 stops the execution of the print job IJ and executes the transport of the print medium W by the transport belt 4 (step SC3). In the processing of step SC3, while the printing based on the print job IJ and the scanning of the carriage 82 are stopped, the transport of the print medium W by the transport belt 4 is executed.

Next, the print control section 112 determines whether or not the non-printable area AF is positioned downstream of the print head 81 in the transport direction H (step SC4). For example, in step SC4, the print control section 112 makes a positive determination when the most downstream nozzle in the transport direction H among the nozzles of the print head 81 is positioned upstream of the non-printable area AF in the transport direction H.

When it is determined that the non-printable area AF is not positioned upstream of the print head 81 (step SC4: NO), the print control section 112 executes the processing of steps SC3 and SC4 again. In addition, the print control section 112 continues the transport of the print medium W by the transport belt 4 in a state where the execution of the print job IJ is stopped and the scanning of the carriage 82 is stopped until a positive determination is made in step SC4.

Meanwhile, when it is determined that the non-printable area AF is positioned upstream of the print head 81 (step SC4: YES), the print control section 112 restarts the print job IJ from the upstream printable area AK-J (step SA13).

In this manner, in the second embodiment, the carriage 82 is caused to scan up to beyond the printing area, which is an outer side of the printing area A2 for forming an image by discharging the ink IK onto the print medium W, and the carriage 82 is retracted. Accordingly, the print head 81 can be prevented from being positioned on the print medium W by causing the carriage 82 to scan up to beyond the printing area and retracting the carriage 82, and the contact between the print medium W and the print head 81 can be avoided.

Third Embodiment

Next, a third embodiment will be described.

The third embodiment is different from the first and second embodiments in the operation of the printer 1 in printing.

Figure 11A:
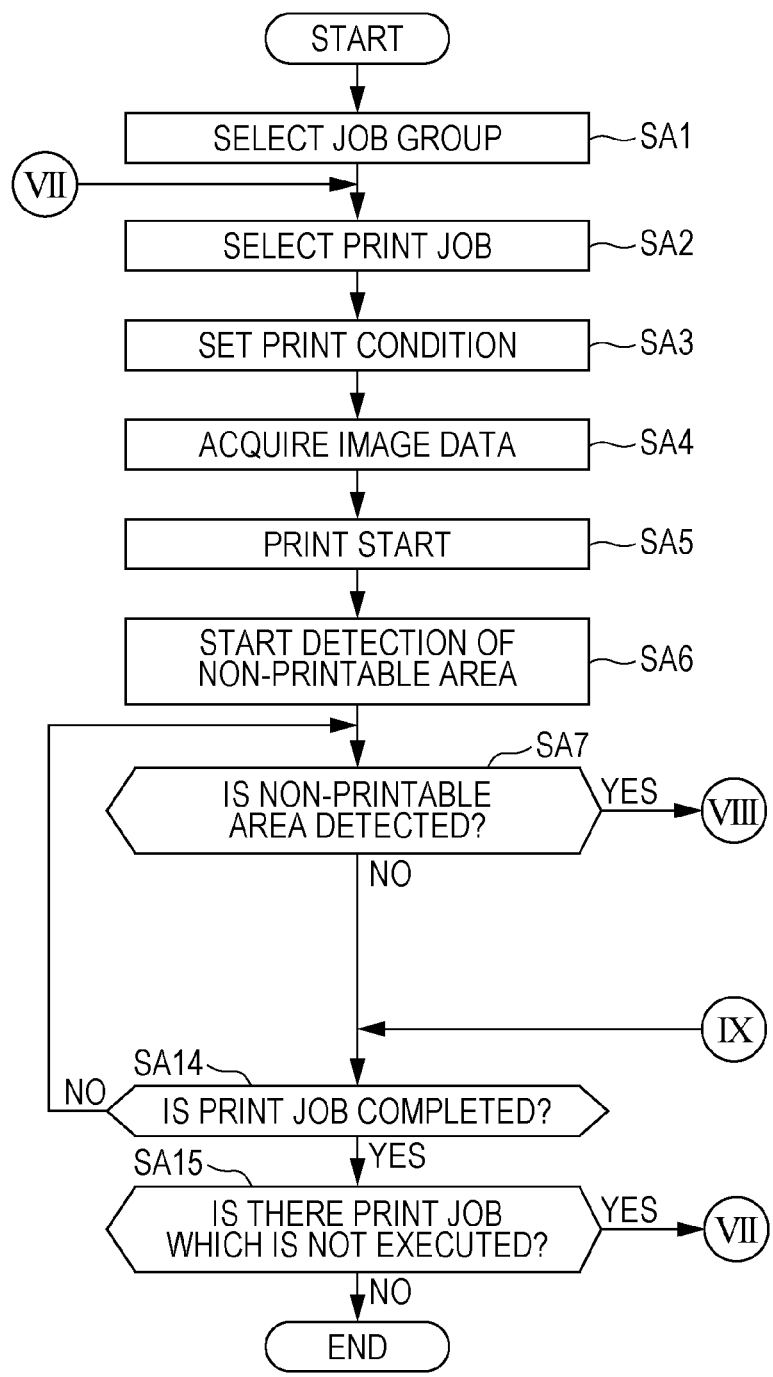
FIGS. 11A and 11B are flowcharts illustrating an operation of a printer according to a third embodiment.
Figure 11B:
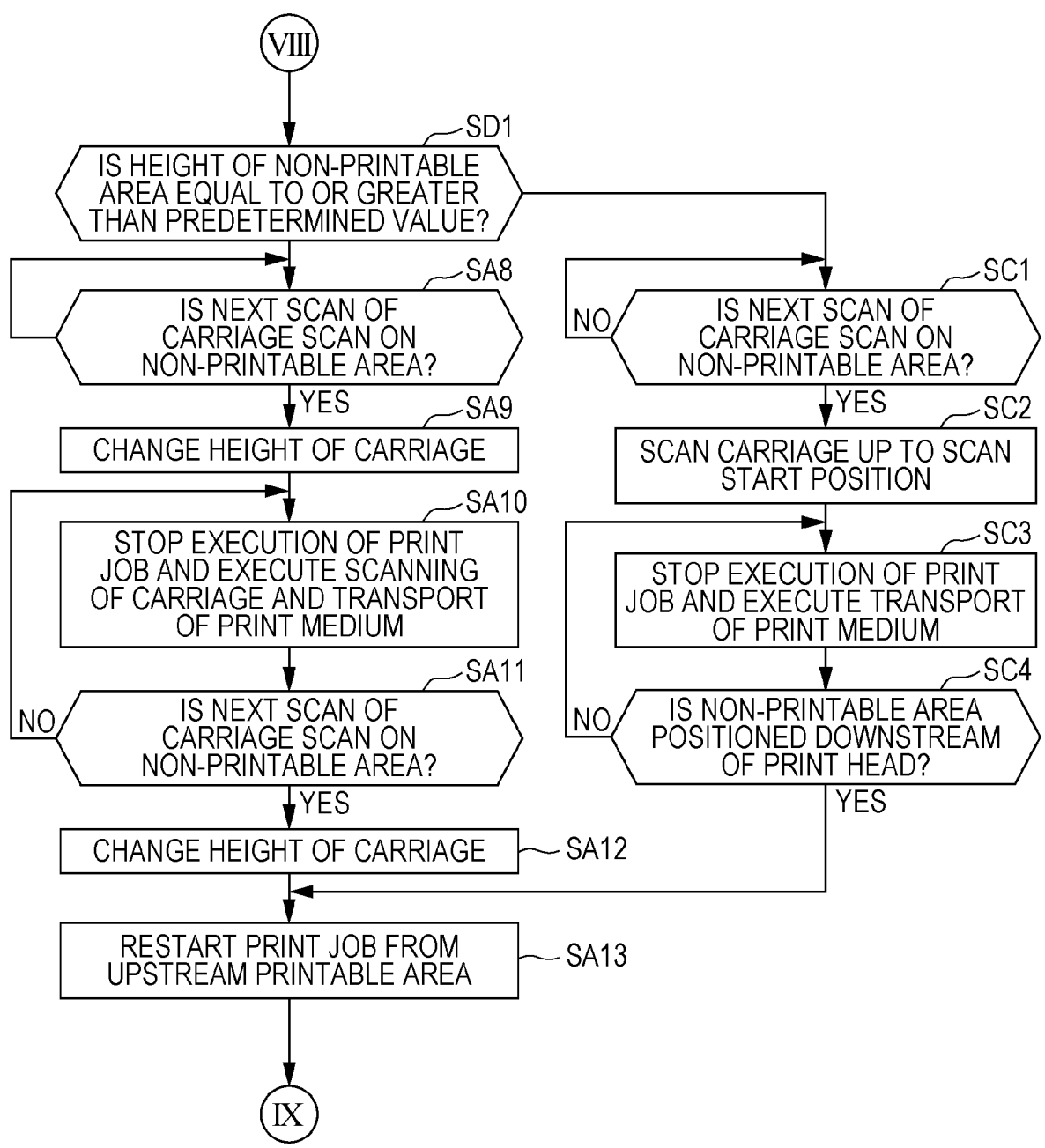

FIGS. 11A and 11B are flowcharts illustrating the operation of the printer 1 according to the third embodiment and illustrate the operation related to printing on the print medium W.

In the flowcharts illustrated in FIGS. 11A and 11B, the same steps as those in the flowcharts illustrated in FIGS. 6A, 6B, 10A, and 10B will be given the same step numbers, and the detailed descriptions thereof will be omitted.

When it is determined that the area detection section 114 detected the non-printable area AF (step SA7: YES), the print control section 112 determines whether or not the height of the non-printable area AF is equal to or greater than a predetermined value (step SD1). The predetermined value referred here is the maximum value of the workpiece gap WG that can be adjusted by the gap adjusting mechanism 83. The print medium W of the embodiment is a textile printing material. Therefore, the thickness of the print medium W differs depending on the print medium W or the fabric that forms the print medium W. Therefore, it is preferable that the predetermined value is a value that differs depending on the thickness of the print medium W.

When it is determined that the height of the non-printable area AF is not equal to or greater than the predetermined value (step SD1: NO), the print control section 112 executes the processing following step SA8. Meanwhile, when it is determined that the height of the non-printable area AF is equal to or greater than the predetermined value (step SD1: YES), the print control section 112 executes the processing following step SC1.

In other words, in the third embodiment, when the height of the non-printable area AF is not equal to or greater than the predetermined value, the carriage 82 is retracted in the retracting mode of the first embodiment, and when the height of the non-printable area AF is equal to or greater than the predetermined value, the carriage 82 is retracted in the retracting mode of the second embodiment. Accordingly, it is possible to efficiently and appropriately use the two types of retracting manners of the carriage 82 and avoid the contact between the print head 81 and the print medium W regardless of the height of the non-printable area AF.

Next, a modification example of each embodiment will be described.

Modification Example

In the above-described embodiments, the sensor unit 7 is an optical sensor. In the modification example, the sensor unit 7 is configured of a camera. In the modification example, similar to the above-described embodiments, the sensor unit 7 includes a first detection camera that is a camera for detecting the non-printable area AF and a second detection camera for detecting the height of the non-printable area AF. According to the control of the control section 100, the first detection camera and the second detection camera image the imaging range including at least a part of the print medium W and output the captured image to the control section 100. The captured images obtained by the first detection camera and the second detection camera may be still images or video.

Similar to the second detection sensor 7B, the first detection camera is provided above the transport belt 4 and images the print medium W placed on the transport belt 4. The imaging range of the first detection camera is set to the imaging range including both end portions of the print medium W placed on the transport belt 4 in the intersecting direction K. The control section 100 detects the non-printable area AF by color difference detection, pattern matching, or the like based on the captured image obtained by the first detection camera.

Similar to the first detection sensors 7A-1 and 7A-2, the second detection camera is provided on either the left side or the right side of the print medium W placed on the transport belt 4. When the second detection camera is provided on the left side of the print medium W, the second detection camera is provided so as to image the left end portion of the print medium W from the left side of the print medium W. When the second detection camera is provided on the right side of the print medium W, the second detection camera is provided so as to image the right end portion of the print medium W from the right side of the print medium W. The control section 100 detects the height of the non-printable area AF by color difference detection, pattern matching, or the like based on the captured image obtained by the second detection camera.

Further, in the modification example, the print status screen 300 displays a thumbnail image of a captured image when the non-printable area AF was detected in association with the area-related information 331. The thumbnail image is a thumbnail image of a captured image captured by the first detection camera. When the first detection camera captures a video, the thumbnail image is a thumbnail image of a frame cut out from the video.

On the print status screen 300, when the operation of the touch panel 1032 for selecting the thumbnail image associated with the area-related information 331 is received, the display control section 113 reproduces the captured image data that is the source of the thumbnail image. When reproducing the captured image data, the display control section 113 may pop up a window different from the print status screen 300. Further, when the captured image data is a video, the display control section 113 may reproduce and display the video at the display position of the thumbnail image in accordance with the operation on the thumbnail image. Similar processing may be performed with respect to the thumbnail images associated with the area-related information 332 and 333.

As described above in each of the embodiments and the modification example, the printer 1 includes: the transport belt 4 that transports the print medium W; the print head 81 that discharges the ink IK to form an image on the print medium W placed on the transport belt 4; the carriage 82 that has the print head 81 mounted thereon and scans in the intersecting direction K that intersects the transport direction H of the print medium W; and the sensor unit 7 that detects the non-printable area AF. In addition, the printer 1 includes the control section 100 that retracts the carriage 82 from the position where the image is formed by the print head 81 when the sensor unit 7 detected the non-printable area AF during the printing, causes the transport belt 4 to transport the print medium W until the non-printable area AF is positioned downstream of the print head 81 in the transport direction H, and continues the printing from the printable area AK adjacent to the non-printable area AF.

Further, in the control method of the printer 1, when the sensor unit 7 detected the non-printable area AF during the printing, the carriage 82 is retracted from the position where an image is formed by the print head 81, the transport belt 4 is caused to transport the print medium W until the non-printable area AF is positioned downstream of the print head 81 in the transport direction H, and the printing is continued from the printable area AK adjacent to the non-printable area AF.

In addition, the control program 121 causes the control section 100 to retract the carriage 82 from the position where an image is formed by the print head 81 when the sensor unit 7 detected the non-printable area AF during the printing, cause the transport belt 4 to transport the print medium W until the non-printable area AF is positioned downstream of the print head 81 in the transport direction H, and continue the printing from the printable area AK adjacent to the non-printable area AF.

According to the printer 1, the control method of the printer 1, and the control program 121, it is possible to execute the printing while automatically avoiding the contact between the print head 81 and the print medium W. Therefore, the operator does not need to stop the printing operation of the printer 1 in order to avoid the contact between the print head 81 and the print medium W.

Therefore, according to the printer 1, the control method of the printer 1, and the control program 121, it is possible to avoid the contact between the print head 81 and the print medium W without deterioration of productivity of the printer 1.

When the sensor unit 7 detected the non-printable area AF during the printing, the control section 100 changes the height of the carriage 82 with respect to the print medium W such that the workpiece gap WG is greater than the workpiece gap WG during the printing, and the carriage 82 is retracted.

With this configuration, the print head 81 can be separated from the print medium W by changing the height of the carriage 82 such that the workpiece gap WG is greater than the workpiece gap WG during the printing and by retracting the carriage 82, and the contact between the print medium W and the print head 81 can be more reliably avoided.

Further, even when the carriage 82 is retracted by widening the workpiece gap WG, the carriage 82 can scan in the intersecting direction K while avoiding the contact between the print head 81 and the print medium W.

Therefore, the flushing operation can be executed with respect to the non-printable area AF while the carriage 82 is being retracted. Therefore, in the printer 1, by changing the height and retracting the carriage 82, it is possible to prevent the thickened ink IK from accumulating in the nozzle for a long period of time before the restart of printing, and it becomes possible to effectively prevent discharge failure due to nozzle clogging that can occur while avoiding the contact.

The control section 100 causes the carriage 82 to scan up to beyond the printing area, which is an outer side of the printing area A2 for forming an image by discharging the ink IK onto the print medium W, and retracts the carriage 82.

With this configuration, the print head 81 can be prevented from being positioned on the print medium W by causing the carriage 82 to scan up to beyond the printing area and retracting the carriage 82, and the contact between the print medium W and the print head 81 can be more reliably avoided. Further, since the carriage 82 is not scanned while the carriage 82 is retracted, the printer 1 can suppress power consumption when avoiding the contact between the print head 81 and the print medium W.

The sensor unit 7 detects the height of the non-printable area AF. When the height of the non-printable area AF detected by the sensor unit 7 is equal to or greater than a predetermined value, the control section 100 causes the carriage 82 to scan up to beyond the printing area.

With this configuration, it is possible to avoid the contact between the print head 81 and the print medium W regardless of the height of the non-printable area AF.

The control section 100 executes the flushing operation by the print head 81 with respect to the non-printable area AF.

With this configuration, it is possible to prevent the thickened ink IK from accumulating in the nozzles while avoiding the contact between the print head 81 and the print medium W, and it is possible to prevent the discharge failure due to the nozzle clogging that may occur while avoiding the contact.

The sensor unit 7 is provided downstream of the placement start position I1 where the transport belt 4 starts the placement of the print medium W and upstream of the print head 81, in the transport direction H.

With this configuration, the sensor unit 7 can detect the non-printable area AF before the non-printable area AF reaches the print head 81, and can more reliably avoid the contact between the print head 81 and the print medium W.

The sensor unit is a camera. The control section 100 displays the captured image of the non-printable area AF obtained by the camera on the display 1033.

With this configuration, in the work of confirming the print state of the printed product, the operator can immediately and easily grasp what kind of non-printable area AF exists on the print medium W, and especially, what kind of seam Se exists on the print medium W. Accordingly, in the work after printing, the work load of the operator can be reduced and the efficiency can be improved.

The print medium W is a fabric. The non-printable area AF includes a seam Se of the fabric.

In general, the thickness of the print medium W differs depending on the print medium W or the fabric that forms the print medium W. Therefore, there is a possibility that the thickness of the seam Se is different for each seam Se even on the same print medium W. In this manner, even when the print medium W is a print medium W of which the thickness may differ depending on the seam Se, the contact between the print head 81 and the print medium W can be avoided without deterioration of the productivity of the printer 1.

Each of the above-described embodiments and modification example illustrate one specific example to which the disclosure is applied, and the disclosure is not limited thereto.

For example, in the above-described first embodiment and the second embodiment, the sensor unit 7 may not include the second detection sensor. Further, in the above-described first embodiment, second embodiment, third embodiment, and modification example, a case where the sensor unit 7 is an optical sensor or a camera is illustrated, but the sensor unit 7 is not limited to the optical sensor and the camera as long as the sensor unit can detect the non-printable area AF and the height of the non-printable area AF.

For example, although the display 1033 of the printer 1 is configured to display the print status screen 300 in each of the above-described embodiments and modification example, the external apparatus of the printer 1 may display the print status screen 300 instead of or together with the display of the printer 1. In this case, the external apparatus acquires appropriate information from the printer 1 at an appropriate timing.

For example, in each of the above-described embodiments and the modification example, the non-printable area AF is described as an example of an area including the seam Se. However, the non-printable area AF may be, for example, an area including a place where the print medium W is in a floating state from the transport belt 4, that is, a place where the so-called floating of the print medium W occurs, and the reason that may cause the contact with the print head 81 in the non-printable area AF is not limited to the seam Se.

For example, in each of the above-described embodiments and the modification example, the printer 1 that transports the print medium W wound in a roll shape and prints an image was described as an example, but the disclosure is not limited thereto. For example, the disclosure can be applied to a printing apparatus that performs printing by fixing and holding the print medium W such as a fabric to be printed and moving the print head 81 relative to the print medium W. For example, the disclosure may be applied to a so-called garment printer in which clothes or sewing fabric is fixed as the print medium W and the ink is discharged onto the print medium W for printing. Further, the disclosure may be applied to a printing apparatus that performs printing on not only a fabric but also a knit fabric, paper, synthetic resin sheets, and the like.

Further, the application target of the disclosure is not limited to an apparatus used alone as a printing apparatus, and may be applied to an apparatus having a function other than printing, such as a multifunction machine having a copy function or a scan function or a POS terminal device.

The printer 1 may be an apparatus that uses the ink IK that is cured by irradiation with ultraviolet rays, and in this case, the printer 1 may be provided with an ultraviolet irradiation apparatus instead of the drying unit 9. Further, the printer 1 may be configured to include a cleaning apparatus that cleans the print medium W dried by the drying unit 9, and other detailed configurations of the printer 1 can be changed in any manner.

Further, each functional section of the control section 100 can be configured as the control program 121 executed by the processor 110 as described above, and additionally can be realized by a hardware circuit in which the control program 121 is incorporated. Further, the printer 1 may be configured to receive the control program 121 from a server apparatus or the like via a transmission medium.

The functions of the control section 100 may be realized by a plurality of processors or semiconductor chips.

Further, for example, the step unit of the operation illustrated in FIGS. 6A, 6B, 10A, 10B, 11A, and 11B is divided in accordance with the main processing content in order to make it easy to understand the operation of the printer 1, and thus, the disclosure is not limited by the division method or name of the processing unit. The step unit may be divided into a larger number of step units in accordance with the processing content. Further, one step unit may be divided so as to include more number of processing. Further, the order of the steps may be appropriately changed within a range that does not interfere with the gist of the disclosure.

What is claimed is:

1. A printing apparatus comprising:
   a transport belt that transports a print medium;
   a print head that discharges ink to form an image on the print medium placed on the transport belt;
   a carriage that mounts the print head thereon and scans in an intersecting direction that intersects a transport direction of the print medium;
   a sensor that detects a non-printable area of the print medium where the print medium placed on the transport belt and the print head are configured to come into contact with each other, the sensor detects a height of the non-printable area; and
   a control section that retracts the carriage from a position where the image is formed by the print head when the sensor detects the non-printable area during printing, causes the transport belt to transport the print medium until the non-printable area is positioned downstream of the print head in the transport direction, and continues printing from a printable area adjacent to the non-printable area,
   wherein, the control section causes the carriage to scan up to beyond a printing area, which is an outer side of the printing area for forming an image by discharging the ink onto the print medium, and retracts the carriage, and
   when the height of the non-printable area detected by the sensor is equal to or greater than a predetermined value, the control section causes the carriage to scan up to beyond the printing area.

2. The printing apparatus according to claim 1, wherein when the sensor detected the non-printable area during the printing, the control section changes a height of the carriage with respect to the print medium such that a workpiece gap, which is a distance between the print medium and a nozzle surface of the print head, is greater than the workpiece gap during the printing, and retracts the carriage.

3. The printing apparatus according to claim 2, wherein the control section executes a flushing operation by the print head on the non-printable area.

4. The printing apparatus according to claim 1, wherein the sensor is provided downstream of a placement start position at which the transport belt starts placement of the print medium and upstream of the print head in the transport direction.

5. The printing apparatus according to claim 1, wherein the sensor is a camera, and
   the control section displays a captured image of the non-printable area obtained by the camera on a display section.

6. The printing apparatus according to claim 1, wherein the print medium is a fabric, and
   the non-printable area includes a seam of the fabric.

7. A control method of a printing apparatus including a transport belt that transports a print medium, a print head that discharges ink to form an image on the print medium placed on the transport belt, a carriage that mounts the print head thereon and scans in an intersecting direction that intersects a transport direction of the print medium, and a sensor that detects a non-printable area of the print medium where the print medium placed on the transport belt and the print head are configured to come into contact with each other, the method comprising:
   retracting the carriage from a position where the image is formed by the print head when the sensor detect the non-printable area during the printing, causing the print belt to transport the print medium until the non-printable area is positioned downstream of the print head in the transport direction, and continuing printing from a printable area adjacent to the non-printable area,
   scanning up to beyond a printing area, which is an outer side of the printing area for forming an image by discharging the ink onto the print medium, and retracting the carriage, and
   detecting a height of the non-printable area and when the height of the non-printable area detected by the sensor is equal to or greater than a predetermined value, scanning up the carriage to beyond the printing area.

8. A printing apparatus comprising:
   a transport belt that transports a print medium;
   a print head that discharges ink to form an image on the print medium placed on the transport belt;
   a carriage that mounts the print head thereon and scans in an intersecting direction that intersects a transport direction of the print medium;
   a sensor that detects a non-printable area of the print medium where the print medium placed on the transport belt and the print head are configured to come into contact with each other; and
   a control section that retracts the carriage from a position where the image is formed by the print head when the sensor detects the non-printable area during printing, causes the transport belt to transport the print medium until the non-printable area is positioned downstream of the print head in the transport direction, and continues printing from a printable area adjacent to the non-printable area, wherein
   when the sensor detects the non-printable area during the printing, the control section changes a height of the carriage with respect to the print medium such that a workpiece gap, which is a distance between the print medium and a nozzle surface of the print head, is greater than the workpiece gap during the printing, and retracts the carriage, and the control section executes a flushing operation by the print head on the non-printable area.

* * * * *